United States Patent
Rangel-Ruiz et al.

(10) Patent No.: US 12,452,120 B1
(45) Date of Patent: Oct. 21, 2025

(54) RECEIVER FOR WIRELESS POWER AND BROADBAND DATA

(71) Applicant: NoiseFigure Research, Inc, Lubbock, TX (US)

(72) Inventors: Carlos Rangel-Ruiz, Renton, WA (US); Jerry Lopez, Renton, WA (US); Alexander William Boothby, Renton, WA (US)

(73) Assignee: NoiseFigure Research, Inc, Lubbock, TX (US)

( * ) Notice: Subject to any disclaimer, the term of this patent is extended or adjusted under 35 U.S.C. 154(b) by 0 days.

(21) Appl. No.: 19/196,726

(22) Filed: May 1, 2025

(51) Int. Cl.
*H04L 27/26* (2006.01)
*H04B 1/00* (2006.01)
*H04B 7/06* (2006.01)

(52) U.S. Cl.
CPC ..... *H04L 27/26412* (2021.01); *H04B 1/0007* (2013.01); *H04B 7/0617* (2013.01); *H04L 27/2653* (2013.01)

(58) Field of Classification Search
CPC .......... H04L 27/26412; H04L 27/2653; H04B 1/0007; H04B 7/0617
See application file for complete search history.

(56) References Cited

U.S. PATENT DOCUMENTS

2017/0077972 A1* 3/2017 Lu ........................ H04B 7/005
2017/0180178 A1* 6/2017 Gollakota ................ H04K 3/25

* cited by examiner

*Primary Examiner* — Sung S Ahn
(74) *Attorney, Agent, or Firm* — Flagship Patents; André Grouwstra; Sikander M. Khan

(57) ABSTRACT

A receiver for wireless power and broadband data comprises an energy harvester for extracting wireless power and one or more radio-frequency frontends configured to down-convert a received frequency band to a receiver intermediate frequency (IF) that is frequency and phase aligned with a transmitter IF. The frequency band includes broadband data and wireless power modulated on multiple orthogonal subcarriers. Coupled with the RF frontends, one or more second-level demodulators process a stream of complex values from the down-converted frequency band. A subcarriers demodulator converts these complex values from the time domain to the frequency domain, outputting a series of subcarrier specifications. A first-level demodulator then converts these subcarrier specifications into data bits, which include the broadband data. This configuration enables low-interference reception and processing of both power and data transmitted wirelessly.

9 Claims, 15 Drawing Sheets

RECEIVER FOR WIRELESS POWER AND BROADBAND DATA

REFERENCES

This application is related to U.S. patent application Ser. No. 18/907,906, entitled "Systems and Methods for Directed Transmission and Reception of Wireless Power and Broadband Data," filed on Oct. 7, 2024, by the same inventors and applicant, and which is co-owned by the same assignee. It is also related to U.S. patent application Ser. No. 19/087,508, entitled "A Transmitter for Wireless Power and Broadband Data," filed on Mar. 22, 2025, by the same inventors and applicant, and co-owned by the same assignee. The related patent applications are hereby incorporated by reference, as if it is set forth in full in this specification.

Each publication, patent, and/or patent application mentioned in this specification is herein incorporated by reference in its entirety to the same extent as if each individual publication and/or patent application was specifically and individually indicated to be incorporated by reference.

BACKGROUND

Technical Field

The disclosed implementations relate generally to systems and methods used in wireless transmission and reception of power and data.

Context

Wireless reception of power has seen increased interest over the last decade. Data is transmitted in ever increasing bandwidths. Existing solutions for the simultaneous transmission of power and broadband data have suffered from interference of the data by the power.

BRIEF DESCRIPTION OF THE DRAWINGS

The technology will be described with reference to the drawings, in which.

Figure 1:
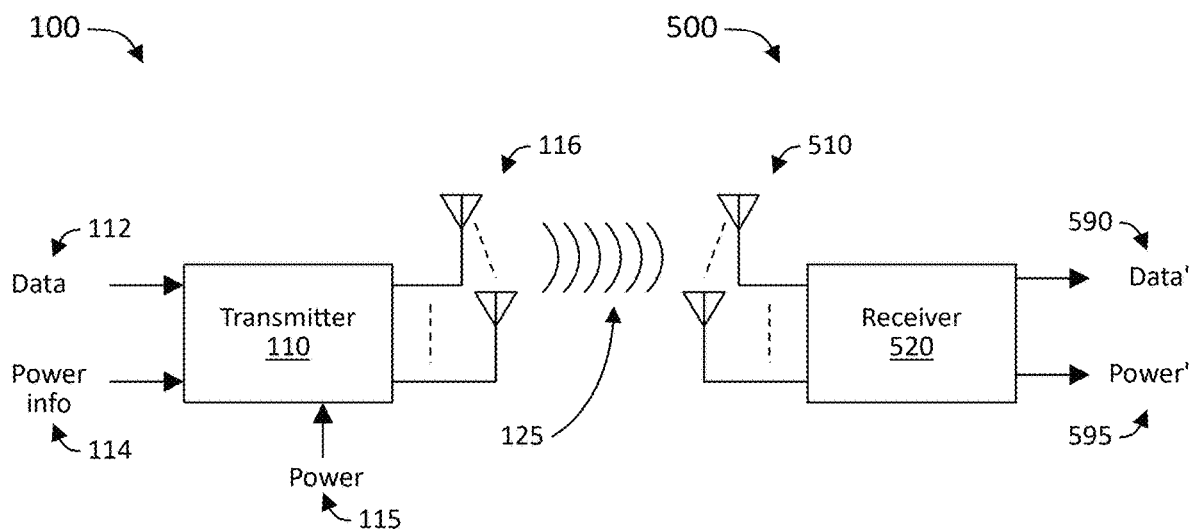
FIG. 1 illustrates an example system including a transmitter and a receiver with spatial directivity. The system is capable of wirelessly transferring broadband data and power from the transmitter to the receiver.

In the figures, like reference numbers may indicate functionally similar elements. The systems and methods illustrated in the figures—and described in the Detailed Description below—may be arranged and designed in a wide variety of different implementations. Neither the figures nor the Detailed Description are intended to limit the scope as claimed. Instead, they merely represent examples of different implementations.

DETAILED DESCRIPTION

Researchers have developed and tested many systems for the wireless transfer of energy along with broadband data. Wireless transmission and reception of digital data has been practiced for many decades, and data transfer bandwidths continue to increase with the availability of ever higher frequency bands in the radio spectrum. With the advent of 6G and 7G transmission systems, and radio spectra above 60 GHZ, very high bandwidths and data rates can become available, for example, data bits may have a rate of more than one hundred megabits per second (100 Mbps) or even more than six gigabits per second (6 Gbps) and the emitted signal may occupy a spectrum of at least ten megahertz (10 MHZ) or even at least two gigahertz (2 GHZ).

Wireless transmission of energy is gaining popularity, as it allows micropower receivers to operate without batteries and other receivers to recharge their batteries. However, the simultaneous transmission of high data rate data and high power in a limited bandwidth has created challenges for data integrity and power efficiency.

For the sake of efficiency, especially when a signal needs to transfer both data and energy, beamforming can help significantly. Beamforming requires the use of multiple antennas, or a phased array antenna. Ideally, beamforming is not static, as for example the position and orientation of mobile devices changes dynamically. Dynamic beamforming requires electronic circuitry to dynamically interface with multiple antennas, for example sub-antennas in a phased array antenna. However, not all systems may need the highest efficiency, so a data and power transfer technology may also need to be compatible with the use of a single antenna.

Implementations provide wireless reception with spatial directivity of wideband data and one or more radio-frequency (RF) carriers that can be used for wireless power charging (WPC). The RF carriers used for WPC may be modulated or unmodulated. Spatial directivity refers to the reception of (data and/or) energy in a specific direction. An electronic circuit that can transmit or receive in a specific direction through beam steering is commonly known as a transmitter beamformer or receiver beamformer. Three types of beamformers are known in the art: analog, digital, and hybrid beamformers. They each have their advantages and disadvantages, but all can be used in implementations.

Beamforming can be achieved with a phased array antenna, i.e., an array of sub-antennas whose signals add up in some directions and fully or partially cancel in other directions. Two sub-antennas cancel their signals in the direction of reception when those signals are of opposite polarity in the direction of reception, that is, if their signals have opposite phase. Their signals reinforce each other if they have the same polarity in the direction of reception, that is, if their signals have the same phase. For example, in the direction of the imaginary line through the two sub-antennas, signals amplify each other if the distance d between the sub-antennas equals an integer N times a signal's wavelength $\lambda$, or $d=N\lambda$. The signals cancel each other if the distance d equals the half wavelength, or $d=(2N-1)\lambda/2$. Thus, the direction in which signals (partially or fully) sum, subtract, or cancel depends on the wavelength, i.e., on the signals' frequency, and the physical arrangement of the sub-antennas. Directivity may be rotated by introducing a phase difference between the signals on the two sub-antennas. By using more than two sub-antennas, a phased array antenna can further increase directivity in the received pattern to increase a signal from the direction(s) needed and reduce it from other directions. Note that directional patterns can be formed by manipulating the phase of antenna signals, the amplitude of antenna signals, or both the phase and the amplitude of the antenna signals.

When there are many sub-antennas in the array, complicated patterns can be achieved, including patterns that resemble beams in certain directions. Beams can be dynamically created by phase shifting the signals being transmitted by the antennas or being received by the antennas. Phase shifting can be achieved by many different electronic circuits, including those that delay signals, and those that multiply signals with a complex scalar.

One technology to transmit many signals and/or power in a tight frequency spectrum, and thus with a high spectral efficiency, is orthogonal frequency division multiplexing (OFDM). OFDM uses multiple subcarriers spaced at equal frequency distances and sends data symbols at least for a duration with which the frequency distance becomes orthogonal. For example, for a one-second symbol duration, subcarriers can be spaced at 1 Hz intervals. For a 3.2 microseconds OFDM symbol duration, subcarriers can be spaced at 312.5 kHz intervals, etc. Information is encoded in the relative amplitude and phase of each subcarrier. While OFDM can provide excellent protection against interference because the subcarriers are orthogonal to each other, beamforming can be complex if the OFDM system has many subcarriers, each with their own wavelength, and the phased array antenna has many sub-antennas. Beamforming with conventional linear-phase filters may be inaccurate and may be difficult to change dynamically.

The technology disclosed herein uses a first level of modulation with OFDM (or similar technology that employs multiple subcarriers that are orthogonal to each other) to simultaneously transmit data and power, and a second level double-sideband (DSB) or single-sideband (SSB) modulation to allow beamforming with a phased array antenna to simultaneously transmit the data and/or power to multiple clients. Similarly, a receiver can combine beamforming and second-level demodulation, followed by OFDM (or similar) demodulation.

The first modulation level preserves orthogonality, which eliminates or greatly reduces interference between the transmitted power and data, and the second modulation level, which uses a single carrier frequency, allows for efficient beamforming. Some examples of transmitters that use this technology have been described in U.S. patent application Ser. No. 18/907,906, entitled "Systems and Methods for Directed Transmission and Reception of Wireless Power and Broadband Data," and U.S. patent application Ser. No. 19/087,508, entitled "A Transmitter for Wireless Power and Broadband Data."

Terminology

As used herein, the phrase "one of" should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The terms "comprising" and "consisting" have different meanings in this patent document. An apparatus, method, or product "comprising" (or "including") certain features means that it includes those features but does not exclude the presence of other features. On the other hand, if the apparatus, method, or product "consists of" certain features, the presence of any additional features is excluded.

The term "coupled" is used in an operational sense and is not limited to a direct or an indirect coupling. "Coupled to" is generally used in the sense of directly coupled, whereas "coupled with" is generally used in the sense of directly or indirectly coupled. Coupled in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term "connected" is used to indicate a direct connection, such as electrical, optical, electromagnetic, or mechanical, between the things that are connected, without any intervening things or devices.

The term "configured" to perform a task or tasks is a broad recitation of structure generally meaning having circuitry that performs the task or tasks during operation. As such, the described item can be configured to perform the task even when the unit/circuit/component is not currently on or active. In general, the circuitry that forms the structure corresponding to configured to may include hardware circuits, and may further be controlled by switches, fuses, bond wires, metal masks, firmware, and/or software. Similarly, various items may be described as performing a task or tasks, for convenience in the description. Such descriptions should be interpreted as including the phrase configured to.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B". This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase based on is thus synonymous with the phrase based at least in part on.

The terms "substantially", "close", "approximately", "near", and "about" refer to being within minus or plus 10% of an indicated value, unless explicitly specified otherwise.

The following terms or acronyms used herein are defined at least in part as follows:
- "ADC"—analog-to-digital converter
- "AGC"—automatic gain control
- "AM"—amplitude modulation
- "ASIC"—application-specific integrated circuit
- "BB"—baseband
- "BER"—bit error rate
- "BPSK"—binary phase shift keying
- "CMOS"—complementary metal-oxide semiconductor
- "DCT"—discrete cosine transform
- "DFT"—digital Fourier transform
- "DPU"—digital processing unit
- "DSB"—double-sideband
- "FET"—field-effect transistor
- "FFT"—fast Fourier transform
- "FIR"—finite impulse response
- "FPGA"—field-programmable gate array
- "GAAFET"—gate-all-around FET
- "GPS"—global positioning system
- "HBT"—heterojunction bipolar transistor
- "IC"—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.
- "ID"—identification
- "IDCT"—inverse discrete cosine transform
- "IDFT"—inverse digital Fourier transform
- "IEEE"—the Institute of Electrical and Electronics Engineers
- "IF"—intermediate frequency
- "IFFT"—inverse fast Fourier transform
- "IIR"—infinite impulse response
- "JFET"—junction FET
- "LDPC"—low-density parity check
- "LNA"—low-noise amplifier
- "LPF"—low-pass filters
- "MCM"—multi-chip module
- "Metadata"—data about other data, or data including configuration information.
- "MEMS"—micro electromechanical system
- "MESFET"—metal-semiconductor FET
- "MOS"—metal-oxide-semiconductor
- "NMOS"—N-type MOS transistor
- "OFDM"—orthogonal frequency division multiplexing
- "PAM"—pulse-amplitude modulation
- "PCB"—printed circuit board
- "PMOS"—P-type MOS transistor
- "POR"—power-on reset
- "PSK"—phase shift keying
- "QAM"—quadrature amplitude modulation
- "QPSK"—quadrature phase shift keying
- "RF"—radio frequency
- "SNR"—signal-to-noise ratio
- "SPCO"—single-pole changeover
- "SPDT"—single-pole double-throw
- "SSB"—single-sideband
- "UI"—user interface
- "VGA"—variable gain amplifier
- "WPC"—wireless power charging

IMPLEMENTATIONS

FIG. 1 illustrates an example system including a transmitter system 100 and a receiver system 500 with spatial directivity. The system is capable of wirelessly transferring broadband data 112 and power 115 from the transmitter system 100 to the receiver system 500. Transmitter system 100 includes transmitter 110 which receives broadband data 112 and power information 114 and processes the broadband data 112 to be transmitted and the power information 114 that specifies transmission of power 115 via an antenna or a phased array antenna 116 and electromagnetic beam 125 to receiver system 500. Receiver system 500, which may also have a phased array antenna 510 coupled with receiver 520, receives electromagnetic beam 125, decodes its signals and harvests (at least a part of) its power, to recreate recovered data 590 and deliver harvested power 595. In a robust implementation and under adequate transmission and reception conditions, recovered data 590 equals broadband data 112 close to 100% of the time and harvested power 595 is a reasonable portion of power 115. Adequate transmission and reception conditions may include a line-of-sight between phased array antenna 116 and phased array antenna 510, sufficiently favorable atmospheric conditions, and a distance between phased array antenna 116 and phased array antenna 510 that allows harvesting a sufficient part of the transmitted power 115 and recovery of the transmitted broadband data 112.

Figure 2:
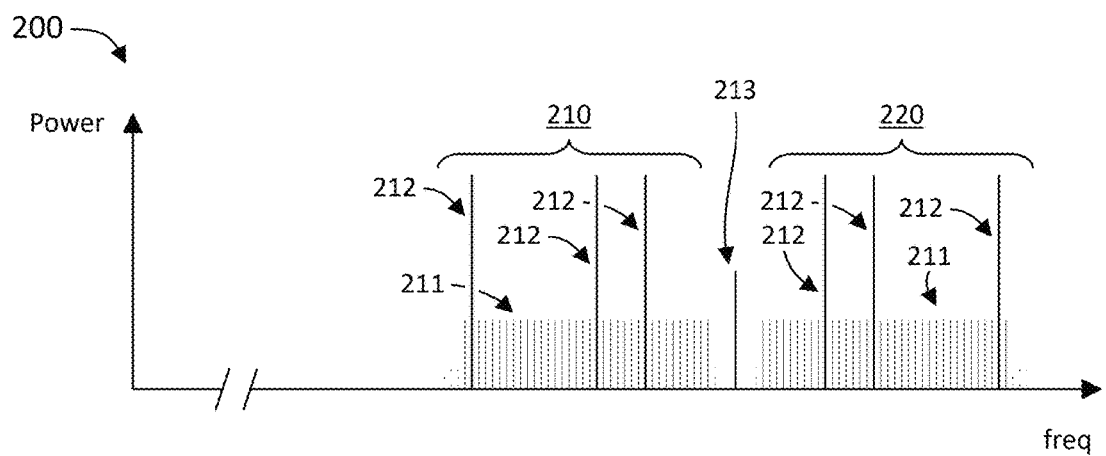
FIG. 2 illustrates an example double-sideband (DSB) spectrum that the transmitter may emit towards the receiver.

FIG. 2 illustrates an example double-sideband spectrum (DSB spectrum 200) that the transmitter may emit towards receiver system 500. DSB spectrum 200 includes a lower sideband 210 and an upper sideband 220. In between lower sideband 210 and upper sideband 220 may be an RF carrier 213, remaining as part of a modulation process. Both lower sideband 210 and upper sideband 220 include up to N subcarriers, including data subcarriers 211 and one or more power subcarriers 212, where N is greater than 1. Upper sideband 220 carries an OFDM (or similar) spectrum with all encoded information, and lower sideband 210 carries the same OFDM (or similar) spectrum, mirrored versus a radio frequency (RF) carrier, which may have been suppressed (as drawn). Although an implementation doesn't need to suppress the RF carrier, it may do so when it does not use the RF carrier for the transmission of power. In some implementations, power subcarriers 212 may have a constant (relatively high) amplitude, i.e., they are select-tone continuous waveforms, whereas data subcarriers 211 may have a relatively low average amplitude, and a temporary amplitude that depends on the data being transmitted. In other implementations, power subcarriers 212 may have any amplitude, for example based on the needs of an individual recipient or group of recipients. In yet other implementations, power subcarriers 212 may be modulated and carry data and/or metadata, too. In typical OFDM systems, data carriers have a flat spectrum, because data is thoroughly randomized to reduce channel disturbances and to provide encryption. Another factor adding to the spectrum's flatness is the removal, as much as possible, of redundancy in the data itself. However, OFDM systems add redundancy to combat channel noise, and to enable detection and correction of transmission errors.

An implementation may generate the OFDM spectrum in various ways. A digital implementation may define the real and imaginary components (or the phase and amplitude) of each carrier and use an inverse digital Fourier transform (IDFT) or an inverse fast Fourier transform (IFFT) to calculate a real and an imaginary time series with the baseband (BB) version of the spectrum of upper sideband 220. An analog implementation may use a reference frequency as an input to a bank of phase locked loops, each of which creates one of the subcarriers. With current technologies, digital implementations are far less costly and have the advantage that they can be designed to any required mathematical precision. An implementation may use any transform that can generate a signal in the time domain based on a definition in the frequency or similar domain, and vice versa. Examples include the Fourier transform, DFT/IDFT, FFT/IFFT, discrete cosine transform and inverse discrete cosine transform (DCT/IDCT), Laplace transform, wavelet transform, and any other orthogonal transform. However, given its present low cost of manufacture and use, examples in this document may show FFT and IFFT implementations, even though other implementations are possible.

DSB amplitude modulation (AM) radio has been demonstrated as early as 1899 (see https://en.wikipedia.org/wiki/Amplitude_modulation and U.S. Pat. No. 775,337, "Wireless Telephone," Roberto Landell de Moura, filed Oct. 4, 1901, issued Nov. 22, 1904) and is still practiced today. However, a disadvantage of DSB AM transmission is its low spectral efficiency, which is never above 50%. This disadvantage was known and understood a long time ago, leading to the development of single-sideband (SSB) radio systems (U.S. Pat. No. 1,449,382 John Carson/AT&T, "Method and Means for Signaling with High Frequency Waves" filed on Dec. 1, 1915; granted on Mar. 27, 1923).

Figure 3:
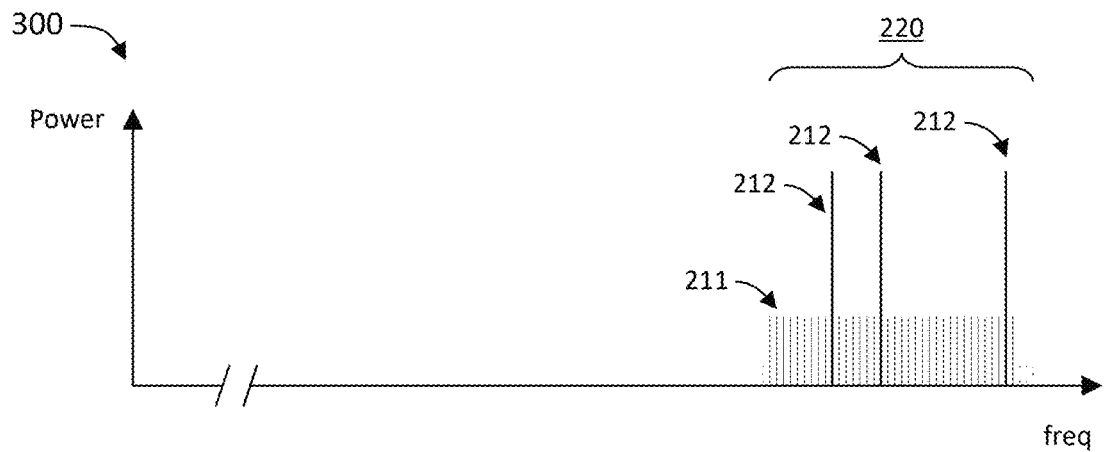
FIG. 3 illustrates an example single-sideband (SSB) spectrum that the transmitter may emit towards the receiver.

FIG. 3 illustrates an example SSB spectrum 300 that the transmitter may emit towards one or more units of receiver system 500. This example shows upper sideband 220, whereas lower sideband 210 has been suppressed, along with the RF carrier. In a typical implementation, most of the subcarriers are used for data, and one or more subcarriers are used for power. Some other carriers may be used as pilot subcarriers to help receiver 520 achieve time and frequency synchronization, and further subcarriers may be used for transmission metadata, i.e., data about the transmission and its parameters. On the outsides of each sideband may be a number of guard subcarriers (here drawn as short dotted lines). These are unused subcarriers with zero (or close to zero) amplitude, which help guard against adjacent channel interference. For example, a WiFi IEEE 802.11a OFDM symbol may have 64 subcarriers, including 48 for data, 4 for pilots, and 12 guard subcarriers, most of which are located at the outsides of the sidebands. The symbol may have a duration of 3.2 μs, to which a cyclic guard interval of 0.8 μs is prepended to guard against multipath (i.e., inter-symbol) interference.

For an N-point IFFT, SSB spectrum 300 can include up to N subcarriers, including data subcarriers 211 and one or more power subcarriers 212. This example shows three power subcarriers, but other implementations may have any other number of power subcarriers 212. Power subcarriers 212 may have a different amplitude than data subcarriers 211, for example a higher amplitude. Although in FIG. 3 all power subcarriers are drawn with the same amplitude, in an implementation the amplitude of the power subcarriers may vary. For example, the amplitude of a power subcarrier for a nearby recipient may be smaller than the amplitude of the power carrier for a faraway customer. Or, as stated earlier, a power subcarrier 212 may be modulated with data or metadata. SSB spectrum 300 may also include pilot carriers (not separately drawn), which may be at a different amplitude (for example, lower) than data subcarriers 211. An implementation may not use all available subcarriers. For example, to reduce interference with other signals in adjacent frequency bands, an implementation may not use some of the outer subcarriers provided by an inverse Fourier transform.

Figure 4:
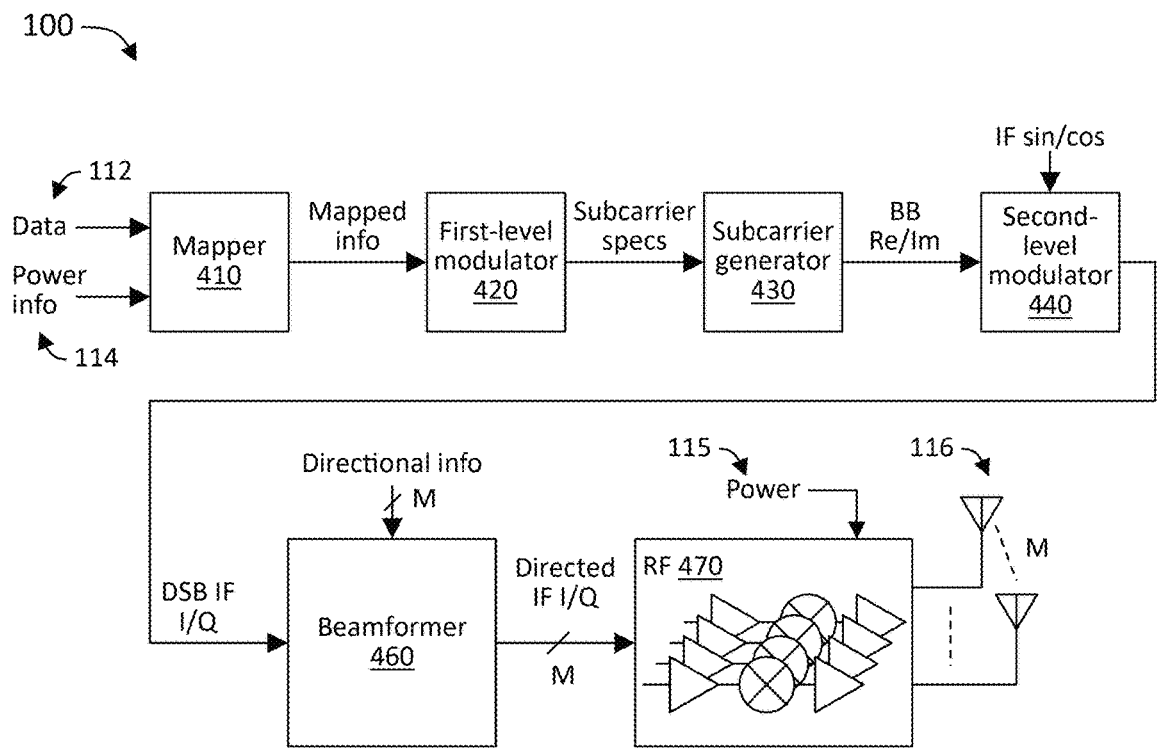
FIG. 4 illustrates an example architecture of the transmitter for DSB directed transmission of power and broadband data.

FIG. 4 illustrates an example architecture of transmitter 110 for double-sideband directed transmission of power and broadband data. Transmitter 110 receives broadband data 112 and power information 114. Transmitter 110 can receive in several modes: transmit (broadband) data only, transmit power according to power information 114 only, or transmit (broadband) data and power according to power information 114 simultaneously. In some implementations, broadband data 112 may have a bandwidth of at least ten megahertz (10 MHz) and a data rate of more than one hundred megabits per second (100 Mbps). In other implementations, broadband data 112 may have a bandwidth of more than two gigahertz (2 GHz) and a data rate of more than six gigabits per second (6 Gbps).

Broadband data 112 may have been compressed for efficiency and encrypted for security. It may include separate messages or streams for separate destinations, each of which may have an individual receiver system 500. DSB transmission may simplify the architecture needed for transmission and the architecture needed for reception of the data. Whereas DSB transmission uses twice the bandwidth of SSB transmission for the same amount of data, in some applications this may be acceptable.

Broadband data 112 and power information 114 enter mapper 410, whose function is to partition data bits into data blocks called frames, each frame to be transmitted during one OFDM symbol and to map data bits in broadband data 112 and metadata in power information 114 to subcarrier specifications for the up to N individual subcarriers in the multi-carrier frequency spectrum to be transmitted. Mapper 410 may further define the function and appearance of subcarriers for other use, such as pilot subcarrier, and guard subcarriers. Mapper 410 may also perform other functions such as adding redundancy to the data to allow for error detection and correction, interleaving data bits over non-adjacent subcarriers to combat fixed-frequency interferences, redistributing data bits over time to combat burst interferences such as may be caused by lighting, and convolutional coding or LDPC coding to ease demodulation. Mapper 410 outputs mapped information, i.e. information about every subcarrier for the duration of the OFDM symbol. The mapped information may include the required amplitude and phase of power subcarriers 212 and pilot subcarriers, the data bits to be included in data subcarriers 211, and which of the subcarriers are designated as guard subcarriers. Mapper 410 may work standalone or according to a communications protocol, such as IEEE802.11 or any other protocol.

The first-level modulator 420 receives the mapped information and converts the mapped information to subcarrier specifications. The subcarrier specifications include complex numbers that each define a real and an imaginary component of a subcarrier. For data subcarriers 211, the subcarrier specification is based on the data bits to be transmitted and on the implemented and/or selected modulation scheme, which may be any modulation scheme known in the art, including binary phase shift keying (BPSK), quadrature phase shift keying (QPSK), M-ary phase shift keying (M-ary PSK), quadrature amplitude modulation (QAM, e.g., QAM16, QAM64, QAM256, etc.), pulse-amplitude modulation (PAM), etc.

First-level modulator 420 works in tandem with orthogonal subcarrier generator 430, which receives the subcarrier specifications and performs a frequency domain to time domain conversion, or a similar transform, generating a baseband real signal (the BB Re signal) and a baseband imaginary signal (the BB Im signal), and outputs these as waveforms (if analog) or as a time-domain series of N successive Re and Im values (if digital) that includes the up to N subcarriers. In some implementations, subcarrier generator 430 performs a transformation other than a frequency domain to time domain conversion. An implementation may use any transform that can generate a signal in (for example) the time domain based on a definition in (for example) the frequency or similar domain, and vice versa. Examples include the Fourier transform, DFT/IDFT, FFT/IFFT, discrete cosine transform and inverse discrete cosine transform (DCT/IDCT), Laplace transform, wavelet transform, and any other orthogonal transform. Orthogonal subcarrier generator 430 may implement an inverse Fourier transform, an N-point IDFT, an N-point IFFT, or any other orthogonal frequency-time (or similar) transform.

The second-level modulator 440 multiplies the BB Re signal with a sine wave of an intermediate frequency (IF) and the BB Im signal with a cosine wave of the intermediate frequency. The multiplications result in amplitude modulation of the BB Re signal into a (DSB) IF I signal and of the BB Im signal into a (DSB) IF Q signal. This modulates the multiple subcarriers onto the real and imaginary components of a single IF carrier.

For example, 63 of the 64 subcarriers of an IEEE 802.11a signal are defined as located symmetrically around the zero frequency at a spacing of 0.3125 MHz between -10 MHz and +10 MHz. However, the subcarriers are not modulated symmetrically, so that a 64-point IFFT outputs both 64 real time samples (the BB Re signal) and 64 imaginary time samples (the BB Im signal). Amplitude modulation of the BB Re signal and the BB Im signal, for example in second-level modulator 440 and with a 25 MHz IF signal, translates the subcarriers to a band from 15 to 35 MHz. Technically, this is a double sideband signal, but the sidebands do not contain the same information because in the IFFT the subcarriers are not typically modulated symmetrically around the zero frequency. However, the amplitude modulation also results in frequency components in the band from −15 to −35 MHz. These components are symmetrical to the frequency components in the band from +15 to +35 MHz. A further translation to an RF frequency (e.g., in RF backend 470) may generate a double-sideband signal, with two sidebands each including the 64 carriers over a band of 20 MHZ, unless the signal is further prepared for single-sideband translation as described in U.S. patent application Ser. No. 18/907,906, entitled "Systems and Methods for Directed Transmission and Reception of Wireless Power and Broadband Data."

Beamformer 460 receives the IF I and Q signal, and directional information for each of M sub-antennas in phased array antenna 116, and modifies the phase and amplitude of the IF I signal and the IF Q signal for each of the M channels that feed phased array antenna 116. It may do so, for example, by multiplying the IF I/Q signal with a first complex number for the first channel, with a second complex number for the second channel, with a third complex number for the third channel, and so on. Thus, beamformer 460 outputs M directed IF I/Q signals, the results of the M complex multiplications of the IF I and Q signals with the M separate complex numbers for the M channels of phased array antenna 116, where the M separate complex numbers define the directivity of phased array antenna 116 for the final RF transmission frequency. However, at this stage the signals are still at the intermediate frequency. M units of RF backend 470 take the M directed IF I and Q signals, upconvert them to the final RF transmission frequency, combine them into M directed complex RF signals, and provide power amplification to power the M sub-antennas in phased array antenna 116.

Although FIG. 4 illustrates an example of a DSB transmitter, in other implementations the transmitter may perform Marple's algorithm to suppress one of the sidebands, and/or may include digital and/or analog filters to suppress one of the sidebands and/or the RF carrier. Further details and examples are given in U.S. patent application Ser. No. 18/907,906.

Figure 5:
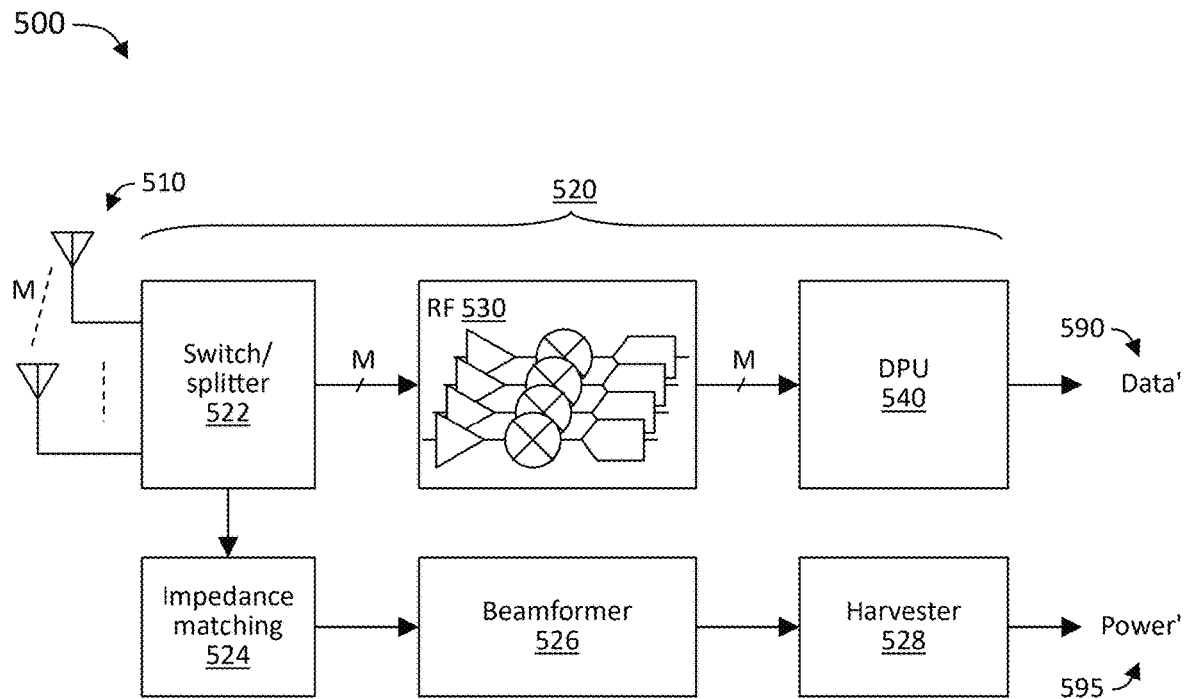
FIG. 5 illustrates an example architecture of the receiver for directed reception of power and broadband data.

FIG. 5 illustrates an example architecture of a receiver system 500 for directed SSB or DSB reception of wireless power and broadband data. Receiver system 500 includes an antenna or phased array antenna 510 coupled with receiver 520. The antenna or phased array antenna 510 may be coupled with switch/splitter 522, which can route received antenna signals towards energy harvester 528 via optional impedance matching circuit 524 and optional beamformers 526; and/or towards digital processing unit (DPU 540) via one or more RF frontends 530. While some or all sub-antennas phased array antenna 510 may be coupled with RF frontend 530 and DPU 540 to receive data, simultaneously others or all sub-antennas may also be coupled with impedance matching circuit(s) 524 and energy harvester 528 to harvest data. Harvested data may be immediately used or stored in a battery or other storage system (not drawn) for later use.

Some implementations may include one or more digital filters (not drawn) between RF frontend(s) 530 and DPU 540. These digital filters, for example infinite impulse response (IIR) or finite impulse response (FIR) filters that may be followed by phase-correcting all-pass filters, may serve to support reception of SSB signals.

Receiver 520 includes the one or more RF frontends 530, and (as further illustrated and described with respect to FIGS. 8 and 9) DPU 540 includes one or more second-level demodulators 550, a subcarriers demodulator 565, and a first-level demodulator 580. The one or more RF frontends 530 receive a frequency band (for example including upper sideband 220 and/or lower sideband 210 in DSB spectrum 200 or SSB spectrum 300) and down-convert the received frequency band to the receiver intermediate frequency (the receiver IF) which is aligned in frequency and phase with the transmitter IF. The received frequency band includes both the broadband data and the wireless power. The one or more second-level demodulators 550 may each be coupled with one of the RF frontends 530. They are configured to demodulate a stream of complex values (including real and imaginary values) from the down-converted frequency band. The subcarriers demodulator 565 converts the complex values from the time domain to the frequency domain (or performs another transformation), converting a series of constellation points of the orthogonal subcarriers included in the frequency band to a series of subcarrier specifications of orthogonal subcarriers. For example, if the subcarriers are QPSK modulated, subcarriers demodulator 565 outputs a series of specifications that may be close to the available subcarrier specifications (+1, +1), (+1, −1), (−1, +1), and (−1, −1). Some of the subcarriers may carry the wireless power, others may carry the broadband data, i.e., they are modulated with information that includes the broadband data. The first-level demodulator 580 and a demapper 585 retrieve the broadband data from the series of subcarrier specifications.

All M sub-antennas in phased array antenna 510 are likely to receive those one or more power subcarriers 212. Thus energy harvester 528 can harvest the most wireless power when it uses all available power subcarriers 212 and all M individual sub-antenna signals (for further details, see the description of FIGS. 6A-F). If M=1, i.e., there is only one antenna, switch/splitter 522 may be coupled with energy harvester 528 via just an impedance matching circuit 524. But if M>1, then the individual signals received on the individual sub-antennas will likely have different delays from the transmitter and unless those delays are evened out, some received wireless power signals may cancel or reduce others. Thus, individual beamformers 526 may be coupled between the individual impedance matching circuits 524 and energy harvester 528 to create equal delays among the signals (or at least equal phase), so that energy harvester 528 can efficiently add the received wireless power signals prior to harvesting. In an implementation where the sub-antennas have fixed relative positions, but where the direction and frequency of the transmitter may vary, the implementation can individually configure the delays of individual beamformers 526.

In an implementation of transmitter system 100 and receiver system 500 where all M sub-antennas in phased array antenna 510 can be used for broadband data reception, switch/splitter 522 can couple each of the M sub-antennas with an instance of RF frontend 530. If N sub-antennas can be used for broadband data reception, where N<M, then switch/splitter 522 can couple each of the N sub-antennas with an instance of RF frontend 530. In an implementation of transmitter system 100 and receiver system 500 where all M sub-antennas in phased array antenna 510 can be used for power harvesting, switch/splitter 522 can couple each of the M sub-antennas with an instance of impedance matching circuit 524. If N sub-antennas can be used for power harvesting, where N<M, then switch/splitter 522 can couple each of the N sub-antennas with an instance of impedance matching circuit 524. Each instance of impedance matching circuit 524 may be coupled with an instance of a beamformer 526, or with energy harvester 528. Even when all sub-antennas are coupled both with impedance matching circuit 524 and RF frontends 530, via switch/splitter 522, an implementation may receive (broadband) data and harvest power at the same time.

Impedance matching circuits, delay lines (capacitive, inductive, long wires, optical), and RF harvesters are well known in the art, and many implementations have been documented, all of which may be used in the disclosed technology. In some cases, an implementation replaces beamformers 526 with configurable LC filters that emulate delays by performing phase rotations. Beamformers 526 can be programmable or configurable, so that DPU 540 can control individual delays based on its knowledge of the direction of an incoming beam and make adjustments dynamically. Energy harvester 528 may be programmable, for example in systems where power subcarriers 212 can have variable frequencies.

Examples of switch/splitter 522, RF frontend 530 and DPU 540 are given with reference to FIGS. 6A-F, 7A-B, 8 and 9.

Figure 6A:
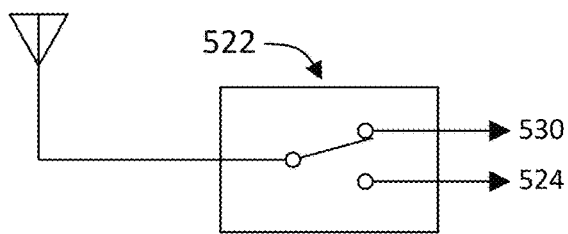
FIGS. 6A-F illustrate examples of a single antenna or an antenna array with a switch/splitter that directs received data towards a power harvester and/or a broadband data receiver.

FIGS. 6A-F illustrate examples of a single antenna or an antenna array with a switch/splitter that directs received data towards a power harvester and/or a broadband data receiver. The antenna array may be a phased antenna array, such as phased array antenna 116 or phased array antenna 510. In FIG. 6A, switch/splitter 522 is coupled with a single antenna. Switch/splitter 522 functions as a switch, for example a single-pole double-throw (SPDT) switch or a single-pole changeover (SPCO) switch, which couples the antenna with either RF frontend 530 or impedance matching circuit 524. Switch/splitter 522 may be manually controlled or machine controlled, for example by DPU 540. In case switch/splitter 522 couples the antenna with RF frontend 530, receiver system 500 can be in broadband data receive mode, and if switch/splitter 522 couples the antenna with impedance matching circuit 524, receiver system 500 can be in power harvesting mode. Switch/splitter 522 may be implemented as a mechanical switch, an electromechanical switch or relay, a micro electromechanical system (MEMS), an electronic switch (usually a transistor), or any other type of switch known in the art.

Figure 6B:
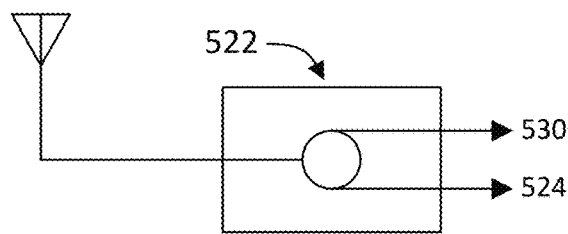

In FIG. 6B, switch/splitter 522 includes a splitter that couples the antenna with both RF frontend 530 and impedance matching circuit 524. In this case, the energy received by the antenna may be divided between the two destinations, resulting in a lower power efficiency and an increased signal-to-noise ratio (SNR). However, this implementation of switch/splitter 522 allows for the simultaneous reception of broadband data and power.

Figure 6C:
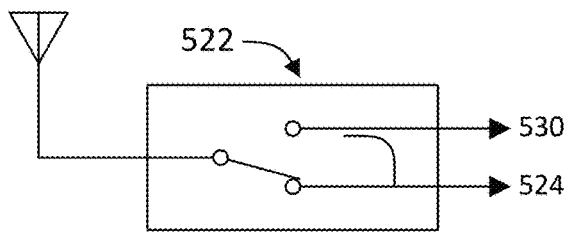

In FIG. 6C, switch/splitter 522 includes a switch and a coupler. The switch may be implemented as in FIG. 6A. However, the coupler allows some of the signal to be coupled with RF frontend 530 even when the switch is positioned for power harvesting. This implementation can make a direct connection to impedance matching circuit 524 for direct harvesting while coupling the signal to RF frontend 530 for communication with reduced signal-to-noise (SNR) communications. In this mode, the system is focused on power harvesting, while providing a path to maintain low-level communication.

The three basic implementations in FIGS. 6A-C can be multiplied (or even mixed and matched) for use in a multiple-antenna system or in a phased array antenna. Examples are provided in FIGS. 6D-F.

Figure 6D:
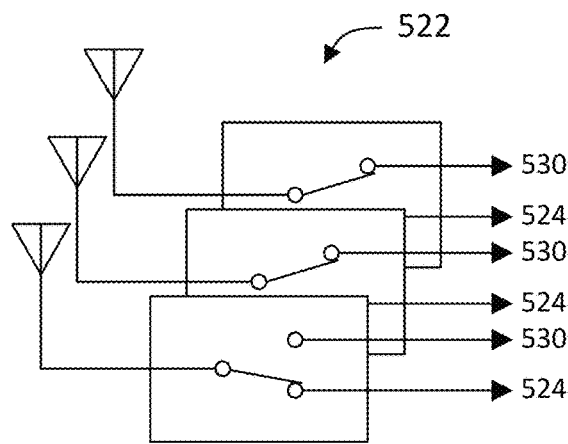

FIG. 6D shows multiple antennas, for example a phased antenna array, coupled with multiple instances of impedance matching circuit 524 and of RF frontend 530, where switch/splitter 522 includes multiple SPDT or SPCO switches. Some antennas may be coupled with RF frontends 530, and other antennas may be coupled with impedance matching circuits 524. This has the advantage that the split of received energy towards data and towards power can be tightly controlled according to the needs of the user. In a system that includes a battery, a user with a full battery may opt to use all antennas for data reception, whereas a user with an empty battery may opt to use a significant number of antennas for power harvesting.

Figure 6E:
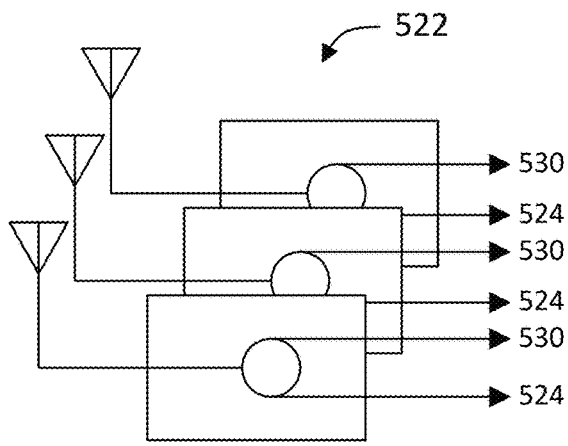

FIG. 6E shows an implementation of switch/splitter 522 in which multiple antennas can each simultaneously couple with both impedance matching circuits 524 and RF frontends 530. As in FIG. 6B, the splitters in FIG. 6E divide the received signal energies, but since all antennas remain available for both data and power, the maximum capability of beamforming remains available.

Figure 6F:
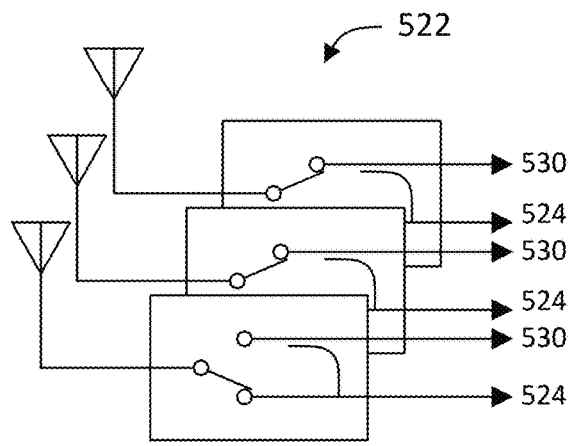

FIG. 6F shows an implementation of switch/splitter 522 in which multiple antennas can each fully couple with an impedance matching circuit 524 or RF frontend 530, while still at least a part of the signal energy is available for communication. This implementation uses couplers as in FIG. 6C.

Figure 7A:
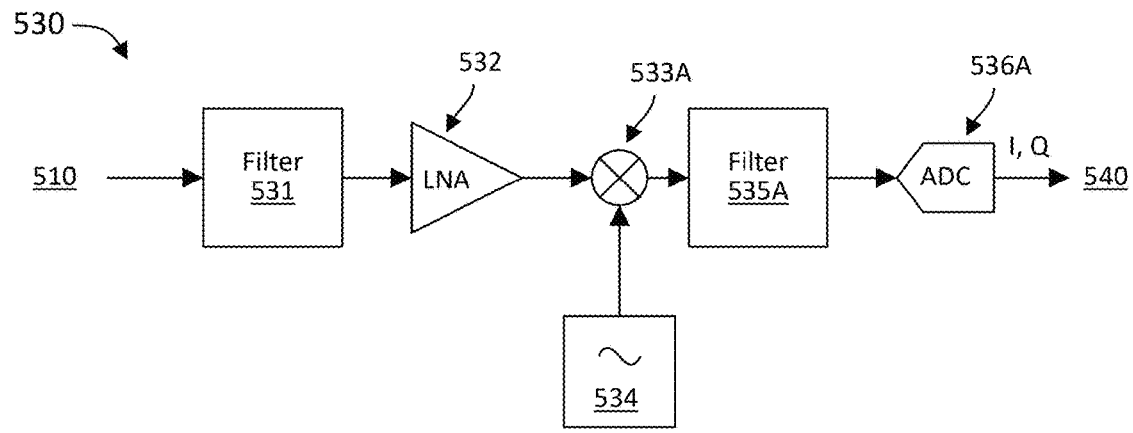
FIGS. 7A-C illustrate examples of radio-frequency frontend (RF frontend) circuits.
Figure 7B:
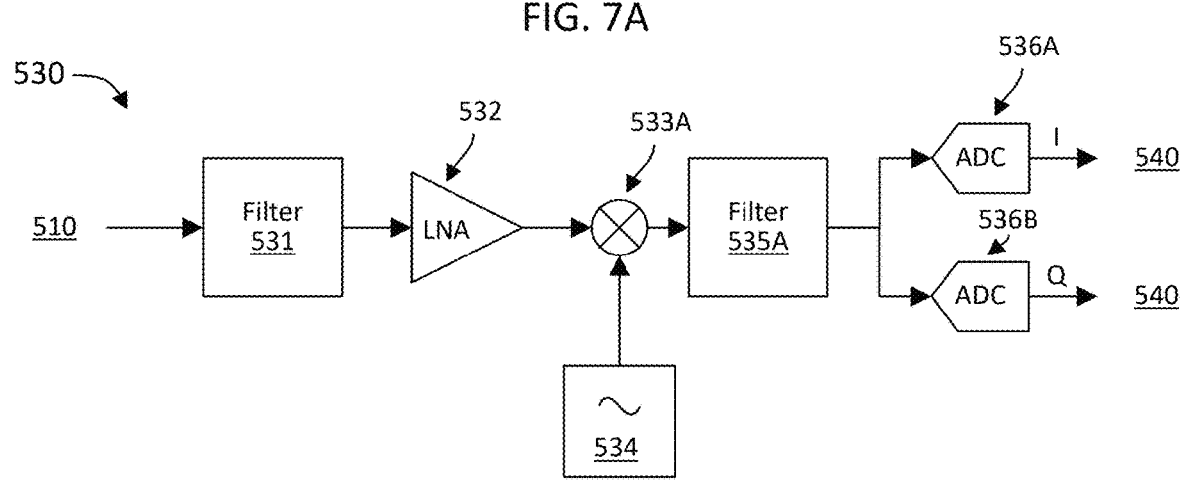
Figure 7C:
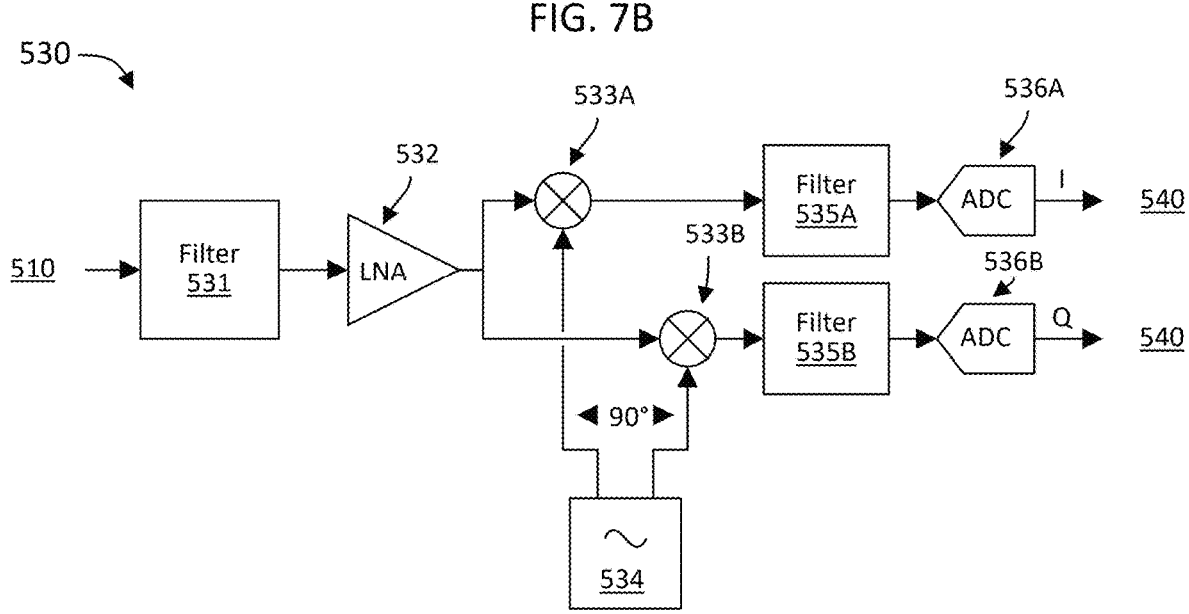

FIGS. 7A-C illustrate examples of radio-frequency frontend (RF frontend 530) circuits. RF frontend architectures and circuits have been developed and produced for over a century, and many variations are known in the art. Each of those variations may be used in implementations of the technology disclosed herein. FIG. 7A shows an implementation with a single stream of output signals. An antenna, or sub-antenna of a phased array antenna, can be coupled with RF filter 531, which may be a tuned filter, a bandpass filter, a low-pass filter, or a high-pass filter. In some implementations, RF filter 531 allows a received SSB signal to pass through while reducing and/or suppressing signals at other frequencies. The output of RF filter 531 is coupled with a low-noise amplifier (LNA 532). RF filter 531 filters out or reduces potentially interfering signals at nearby frequencies that could overpower the sensitive input of LNA 532. Mixer 533A, which may be a multiplier or a nonlinear device, has a first input coupled with the output of LNA 532 and a second input coupled with the output of local oscillator 534, which produces a signal with a frequency that may be different than the frequency band to be received, so that the mixer 533A output signal includes a down-converted frequency band at the frequency difference as well as an up-converted frequency band at the sum of the mixer input signal frequencies. Filter 535A, which may be a low-pass filter or a bandpass filter, eliminates or reduces the up-converted frequency band from the signal (or in some cases the down-converted frequency band), so that remaining signal components fall within the bandwidth of the analog-to-digital converter (ADC 536A), which samples the (up-converted or) down-converted frequency band and digitizes the sampled signal to delivers a stream of values for DPU 540. In this case, the ADC sample rate may be phase and frequency aligned with four times the IF used in the transmitter. An implementation may also use filter 535A to filter out a lower or higher sideband in case of SSB reception. The stream of values includes both in-phase (I) and quadrature (Q) values.

FIG. 7B shows an implementation with separate I and Q output signals. In this case, two ADCs, ADC 536A and B, may alternatingly sample the output signal of filter 535A, to digitize the quadrature IF signal at least at four phases during its cycle: at 0, 90, 180, and 270 degrees. The samples by ADC 536B at 0 and 180 degrees provide the positive and negative peak values of the Q signal and the samples by ADC 536A at 90 and 270 degrees provide the positive and negative peak values of the I signal. Compared with the implementation of FIG. 7A, this implementation has the advantage that the speed of the ADC can be lower, but the disadvantage that two ADCs are needed. The sample rate of the ADCs are phase and frequency aligned with two (2) times the intermediate frequency used in the transmitter, and the phase of sampling ADC 536B is shifted ninety degrees from the phase of sampling ADC 536A.

FIG. 7C shows another implementation with separate in-phase and quadrature output signals. In this case, local oscillator 534 has two output signals, with a 90-degree phase shift so that they are orthogonal to each other. There are two mixers 533A-B, two filters 535A-B, and two ADCs 536A-B. The signal path through mixer 533A, filter 535A, and ADC 536A is as described with reference to FIG. 7A. ADC 536A delivers a digitized in-phase (I) output signal for DPU 540. Mixer 533B has a first input coupled with the output of LNA 532 and a second input coupled with the second output of local oscillator 534. Its output is coupled with filter 535B, whose output is coupled with ADC 536B. ADC 536B delivers a digitized quadrature (Q) output signal for DPU 540.

Whether an implementation uses the general architecture of FIG. 7A, B, or C, it may add any circuits commonly used in the art, including but not limited to a variable gain amplifier (VGA) and/or an automatic gain control (AGC).

The frequency of the I and Q components in FIGS. 7A-B may equal the intermediate frequency (IF) of the second-level modulator 440 in transmitter system 100. However, per the Nyquist sampling theorem, the ADC 536 sample rate must be at least four times the IF frequency (FIG. 7A), or at least twice the IF frequency (FIGS. 7B-C). To ensure that the frequency and phase of the IF signal in receiver system 500 are locked to the frequency and phase of the IF signal in transmitter system 100, a controller 544 or synchronizer 560 in DPU 540 controls the frequency and phase of local oscillator 534.

Figure 8:
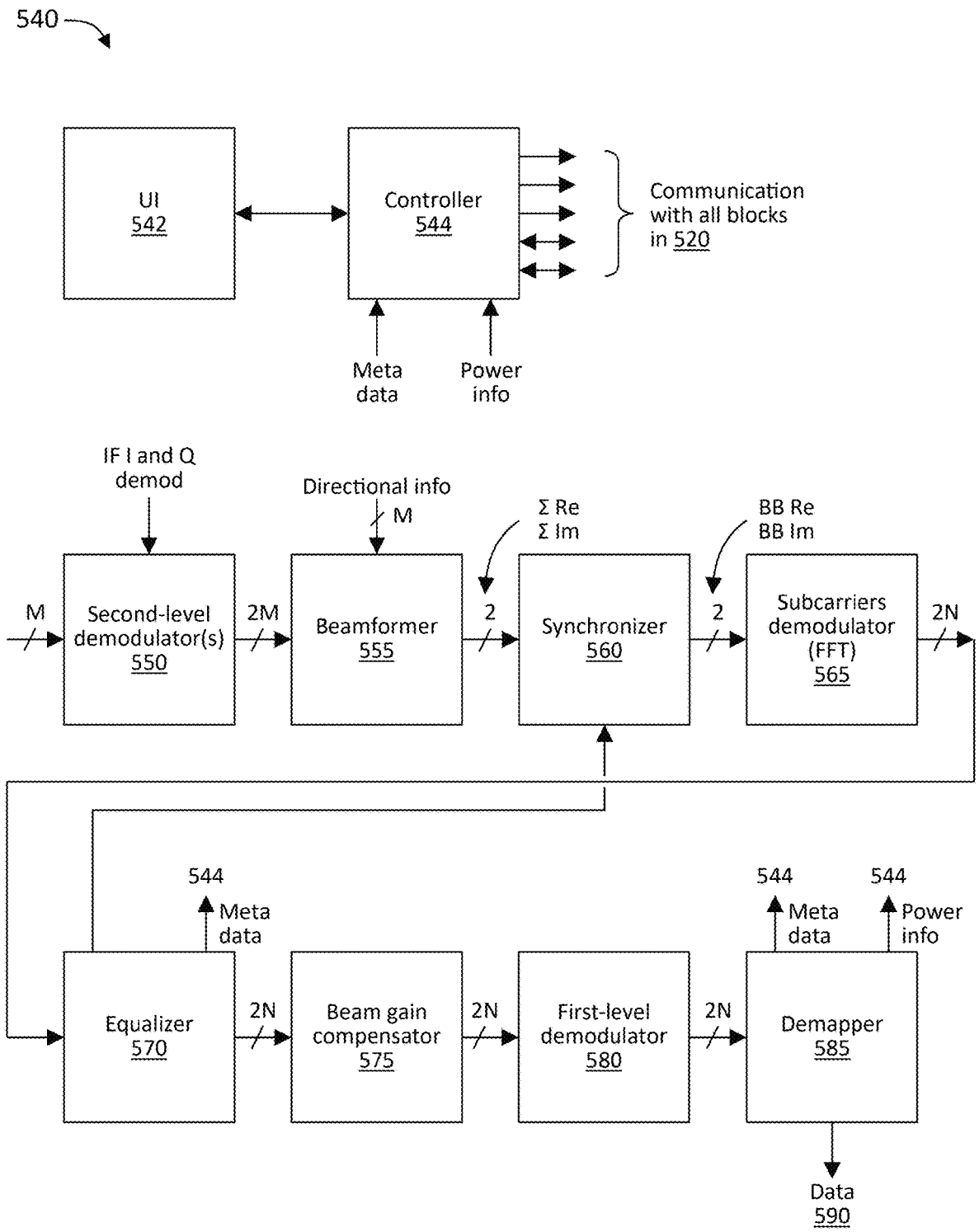
FIG. 8 illustrates an example of a digital processing unit (DPU).

FIG. 8 illustrates an example implementation of DPU 540. DPU 540 includes a controller 544 that may be coupled with a user interface (UI 542). Controller 544 may include memory, hardwired logic, and/or programmable logic, as per the requirements of a specific implementation. Controller 544 may be coupled with and control each of the other blocks in DPU 540 as well as each of the other blocks in receiver 520. The signal path in DPU 540 includes one or more instances of second-level demodulator 550, each of which receives a digitized signal (for example from one ADC sampled at 4 or 8 times the intermediate frequency or from two ADCs sampled at twice the intermediate frequency) from an instance of RF frontend 530. Each second-level demodulator 550 also receives a copy of an in-phase and quadrature IF demodulation signal at the frequency and phase of the IF signal at second-level modulator 440 in transmitter system 100. This IF demodulation signal may be a digitized version of the sine and cosine with a precision of one bit or more (as shown in FIGS. 10B-C).

Each second-level demodulator 550 delivers two output signals (real and imaginary parts of a modulated signal). Thus, in a system with M instances of RF frontend 530, there are M instances of second-level demodulator 550 and a total of M pairs of output signals of second-level demodulators 550. The M pairs of output signals are received by beamformer 555, which also receives directional information associated with each of the M antennas. Beamformer 555 adjusts the phases of its M pairs of input signals and accumulates the results to generate a real/imaginary pair of input signals ($\Sigma$ Re and $\Sigma$ Im) for synchronizer 560. Example implementations of an instance of second-level demodulator 550 with the associated circuitry in beamformer 555 are described with reference to FIGS. 12 and 13.

The start and end of the frame need to be determined, so that the signal can be properly deserialized for the FFT (or other transform) in subcarriers demodulator 565. OFDM signals may be preceded by a guard interval that protects against intersymbol interference. In those cases, the frame starts at the end of the guard interval and ends at the beginning of the next guard interval. These are all functions of synchronizer 560, whose input is the Σ Re and Σ Im signals as well as information fed back from equalizer 570, and whose output is the baseband real and imaginary signals (BB Re and BB Im signals). Synchronizers for OFDM receiver systems are well known in the art and any such synchronizer implementations may be used in the technology disclosed herein. For example, the IF needs to be fully aligned in phase and frequency with the IF used in transmitter system 100.

Subcarriers demodulator 565 may include a digital Fourier transform (DFT), fast Fourier transform (FFT) circuit, or other transform circuit, as specified by an implementation's transmission format. Subcarriers demodulator 565 takes deserialized time-domain input signals (BB Re and BB Im signals) from synchronizer 560 and converts these to 2N frequency-domain signals subsequently used in equalizer 570, beam gain compensator 575, first-level demodulator 580, and at the input of demapper 585. Like synchronizers, equalizers for OFDM and similar receiver systems are well known in the art and any known equalizer implementations may be used in the technology disclosed herein.

Although an RF frontend 530 may include gain control to help its ADC receive an appropriate signal level, the action of beamformer 555 may still change the overall signal level that subcarriers demodulator 565 receives. While subcarriers demodulator 565 can function fine with variable signal input levels, first-level demodulator 580 needs to have the correct signal levels to correctly interpret each of the subcarrier specifications (in the frequency domain) delivered by subcarriers demodulator 565. An implementation may deduce the correct signal level from pilot subcarriers in the OFDM frame, and hence equalizer 570 or alternatively an optional beam gain compensator 575 can scale the overall output levels. First-level demodulator 580 receives the scaled specifications of the subcarriers that were provided by subcarriers demodulator 565 and retrieves the data bits and other information modulated into the subcarriers. A demapper 585 receives the data bits and other information, and performs all functions required by the modulation system (such as OFDM), including removing transmission redundancies, error detection and correction, time de-interleaving, and frequency de-interleaving. Demapper 585 also retrieves metadata (information about the data and/or about the configuration of the transmission) and information about the power transmitted and forwards the metadata and power information to controller 544. It further provides the demodulated and error-corrected data bits (recovered data 590) at the receiver 520 output.

Figure 9:
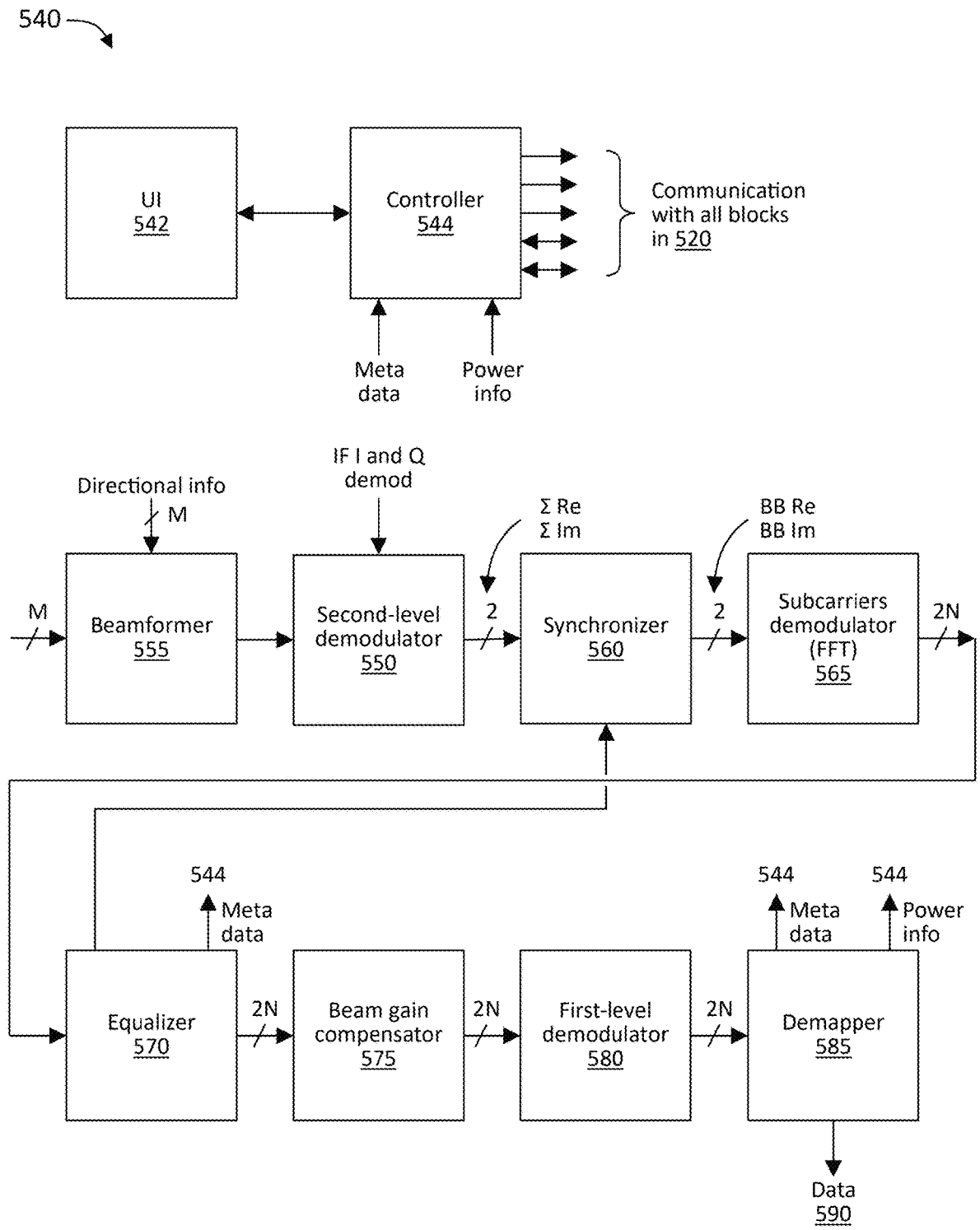
FIG. 9 illustrates another example of a DPU.

FIG. 9 illustrates another example implementation of DPU 540. DPU 540 includes controller 544 that may be coupled with user interface (UI 542). Controller 544 may include memory, hardwired logic, and/or programmable logic, as per the requirements of a specific implementation. Controller 544 may be coupled with and control each of the other blocks in DPU 540 as well as each of the other blocks in receiver 520. The signal path in DPU 540 may start with beamformer 555, which receives a digitized signal (for example from one ADC at 4 times the intermediate frequency or from two ADCs at twice the intermediate frequency) from each of the instances of RF frontend 530. Beamformer 555 may be omitted if receiver system 500 has only a single antenna.) Beamformer 555 multiplies the IF signal from a sub-antenna and its coupled RF frontend 530 with a complex scalar (the directional info) to modify the phase of the IF signal to be aligned with the phases of other instances of the IF signal (from other sub-antennas and their coupled RF frontend 530) and accumulates the aligned IF signals. An implementation may maximize the accumulated signal, or it may maximize the signal-to-noise ratio for the desired signal if an interfering signal is received in the same band.

A second-level demodulator 550 is coupled with the output of beamformer 555 and receives the accumulated and direction-optimized IF signal. Second-level demodulator 550 demodulates the orthogonal components included in the IF signal by multiplying the IF signal with both an in-phase IF demodulation signal and a quadrature IF demodulation signal. For example, if the IF is at 25 MHZ, and the sample rate is 100 MHZ, then the in-phase IF demodulation signal may have the values 0, +1, 0, −1 in one cycle, and the quadrature IF demodulation signal may have the values 1, 0, −1, 0. Thus, the IF demodulation signals in this case alternatingly pass the value of the IF signal, that is, alternatingly pass the real and imaginary baseband components. A sample rate of lower than 100 MHz would degrade the orthogonal sampling process, and therefore the minimum sampling rate for the IF signal is 4 times the frequency of the IF signal. Some implementations may lock the ADC 536 sample rate at 4, 8, or generally at 4N times the IF frequency, where N is an integer of 1 or greater.

Second-level demodulator 550 passes the values of a real/imaginary pair of input signals (Σ Re and Σ Im) to synchronizer 560. The description of synchronizer 560, subcarriers demodulator 565, equalizer 570, beam gain compensator 575, first-level demodulator 580, and demapper 585 and their functionality is identical to the description provided with reference to FIG. 8 and is not repeated here.

Figure 10A:
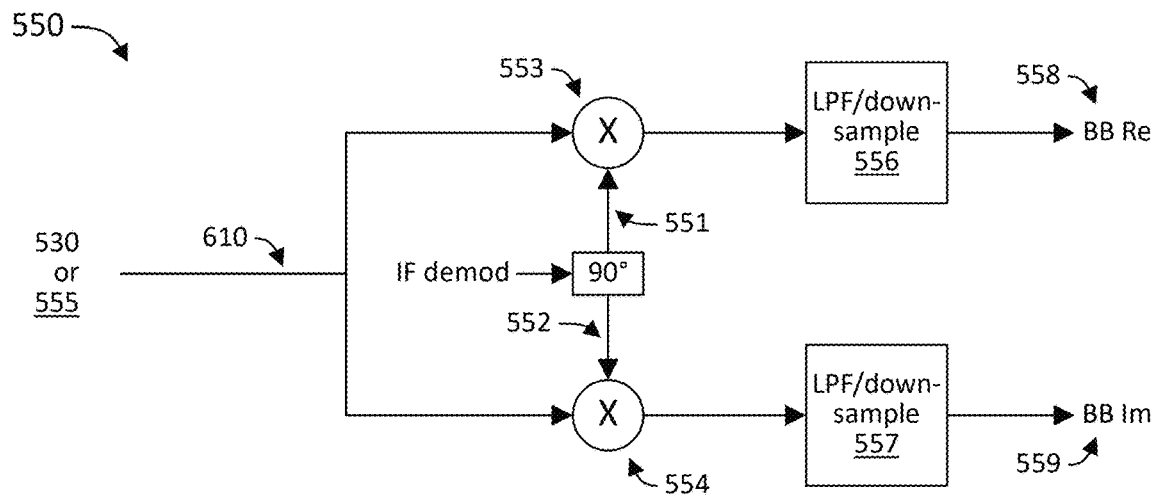
FIGS. 10A-C illustrate an example implementation of second-level demodulator and waveforms that may be used for demodulation.
Figure 10B:
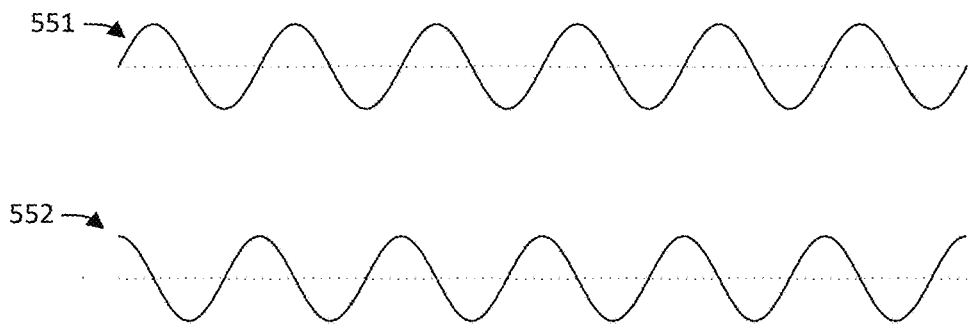
Figure 10C:
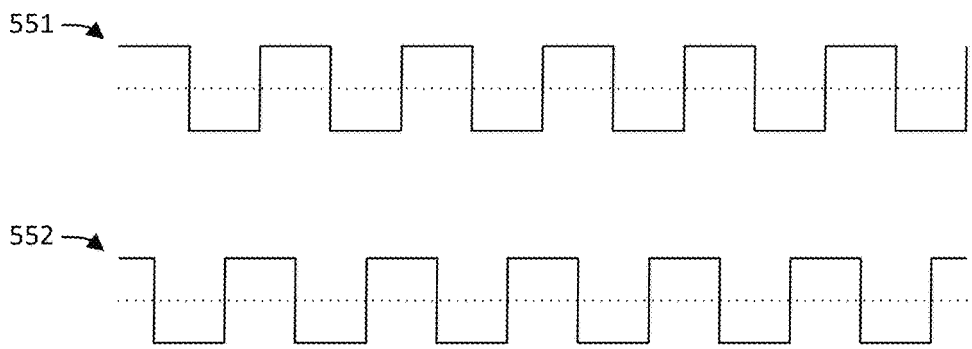

FIGS. 10A-C illustrate an example implementation of second-level demodulator 550 and waveforms that may be used for demodulation. Second-level demodulator 550 in FIG. 10A receives its input signal from beamformer 555 or from RF frontend 530. The signal may be an IF signal orthogonally amplitude modulated with real and imaginary values of the baseband signal. This means that the IF signal is a composite that includes an IF sine wave modulated with the real values and an IF cosine wave modulated with the imaginary values. Multiplying the composite with the in-phase IF demodulation signal, e.g., a sine wave as in FIG. 10B or rectangular wave in phase with the sine wave as in FIG. 10C will eliminate the modulated cosine wave and rectify the modulated sine wave. Multiplying the composite with the quadrature IF demodulation signal, e.g., a cosine wave as in FIG. 10B or rectangular wave in phase with the cosine wave as in FIG. 10C will eliminate the modulated sine wave and rectify the modulated cosine wave, as described above.

Second-level demodulator 550 couples its input with a first multiplier and with a second multiplier, whose second inputs are configured to receive sine or rectangular waves (or other appropriately shaped waves) that are 90 degrees phase shifted from each other, i.e., that are orthogonal to each other. For example, IF input signal 610 is coupled with a first input of first multiplier 553 and it is coupled with a first input of second multiplier 554. The second input of first multiplier 553 receives in-phase IF demodulation signal 551 and the second input of second multiplier 554 receives quadrature IF demodulation signal 552. First multiplier 553 outputs demodulated real values and second multiplier 554 outputs demodulated imaginary values. In some implementations, second-level demodulator 550 may further include low-pass filters for the demodulated real values and demodulated imaginary values signals to eliminate higher frequency components. In some cases, these low-pass filters (LPF 556 and LPF 557) simply decimate or down-sample the demodulated real values and demodulated imaginary values to obtain real baseband values 558 and imaginary baseband values 559.

Figure 11:
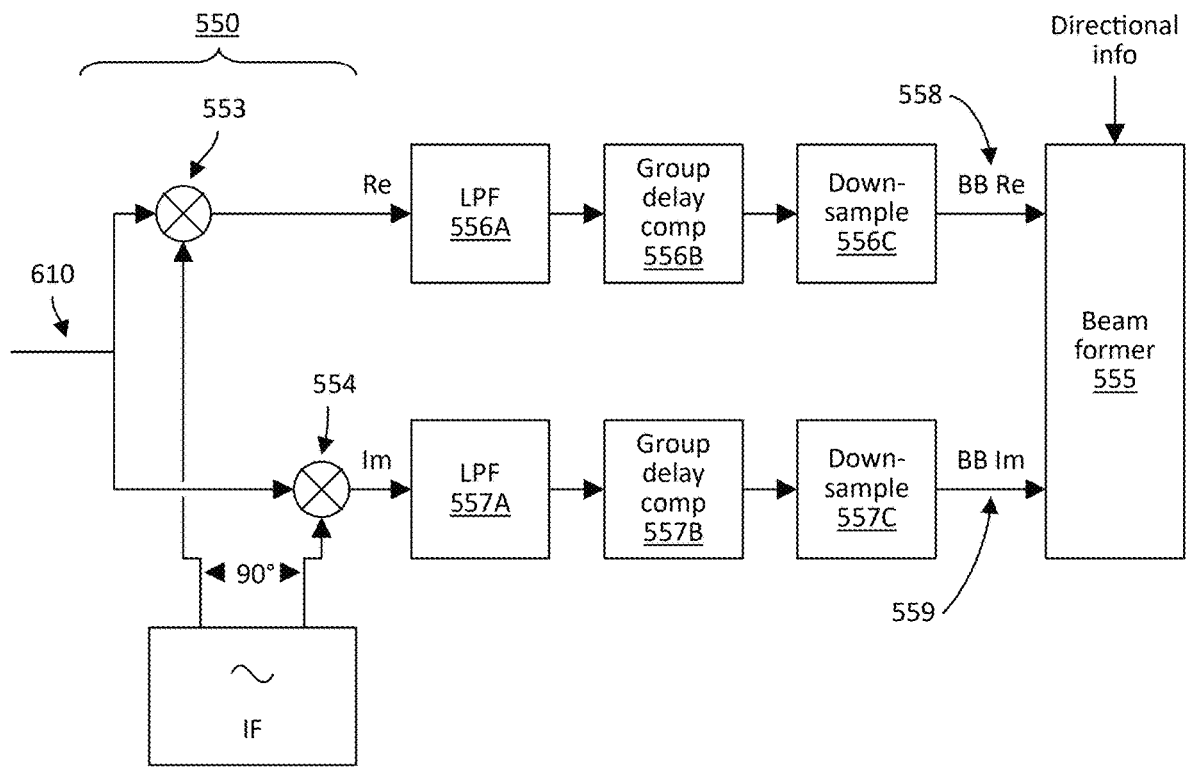
FIG. 11 illustrates example details of an implementation of second-level demodulator and beamformer suitable for use with a high sample rate analog-to-digital converter (ADC).

FIG. 11 illustrates example details of an implementation of second-level demodulator 550 and beamformer 555 suitable for use with a high sample rate ADC 536A. For example, if beamformer 555 and subcarriers demodulator 565 operate at a clock frequency of 100 MHz and the intermediate frequency is 25 MHz, but ADC 536A is sampled at 200 MHZ, then one cycle of the IF will include 8 successive samples. Down-sampling must reduce this to 4 samples. LPF 556 and LPF 557 must each be split into a low-pass filter 556A or 557A, for example a $24^{th}$ order low-pass filter, an all-pass filter 556B/557B to compensate for group delays caused by the low-pass filter, and the actual down-sampler 556C/557C which discards every second sample. This implementation can work for any change of the sample rate, for example 8 to 2 if the input to down-sampler 556C or 557C is bandlimited to $f_{sample}$/downrate by the low-pass filter. In another implementation, the chains of 556A-C and 557A-C are replaced by respective half-band polyphase filters to obtain a down-sample rate of two.

In this implementation, first multiplier 553 and second multiplier 554 multiply IF input signal 610 from ADC 536A with the sine and cosine versions of the intermediate frequency, resulting in the demodulated baseband values. The digital filter removes unwanted frequency components; the all-pass filter corrects the phase errors caused by the digital filter; and the down-sampler reduces the sample frequency from 200 MHz to 100 MHZ, ready for phase rotation by beamformer 555. Beamformer 555 aligns the phase with the phases received from other antenna signals from the phase array antenna and accumulates the phase-rotated signals from the sub-antennas for further processing in synchronizer 560.

Figure 12:
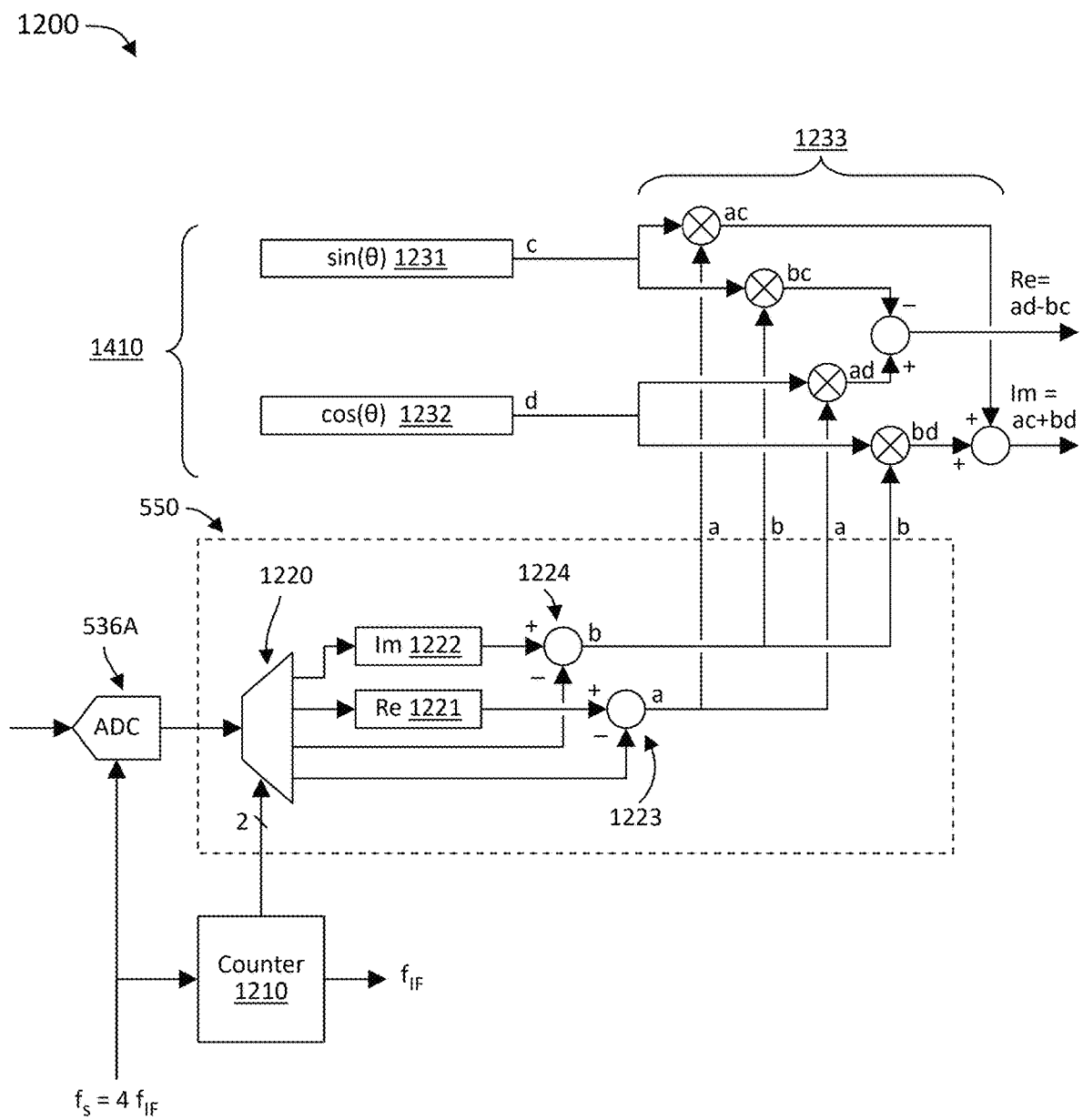
FIG. 12 illustrates an example implementation that combines the ADC of an instance of the RF frontend in FIG. 7A with an instance of the second-level demodulator and the associated phase-rotating circuitry in the beamformer.

FIG. 12 illustrates an example implementation 1200 that combines ADC 536A of an instance of RF frontend 530 in FIG. 7A with an instance of second-level demodulator 550 and the associated phase-rotating set 1410 in beamformer 555. In this implementation, ADC 536A samples the down-converted RF signal at a sample frequency $f_S$ that equals 4 times the intermediate frequency $f_{IF}$ used in the transmitter for second-level modulation, and that is phase-aligned with $f_{IF}$. Counter 1210, which may count to 4, cyclically counts the successive binary numbers 00, 01, 10, and 11, which the implementation uses as a selector signal for multiplexer 1220. Multiplexer 1220 has an input coupled with the output of ADC 536A, and 4 outputs. Apart from multiplexer 1220, second-level demodulator 550 may include first register 1221, second register 1222, first subtractor 1223, and second subtractor 1224. First register 1221 and second register 1222 each have an input coupled with an output of multiplexer 1220. First subtractor 1223 has a positive input (an input that adds) coupled with the output of first register 1221 and a negative input (an input that subtracts) coupled with an output of multiplexer 1220. Second subtractor 1224 has a positive input coupled with the output of second register 1222 and a negative input coupled with an output of multiplexer 1220. When the selector signal equals 00, for example at 0 degrees of the IF cycle, multiplexer 1220 forwards its input signal to second register 1222, which stores the input signal. When the selector signal equals 01, for example at 90 degrees of the IF cycle, multiplexer 1220 forwards its input signal to first register 1221, which stores the input signal. When the selector signal equals 10, for example at 180 degrees of the IF cycle, multiplexer 1220 forwards its input signal to the inverting input of second subtractor 1224, which subtracts the input signal from the stored input signal in second register 1222. When the selector signal equals 11, for example at 270 degrees of the IF cycle, multiplexer 1220 forwards its input signal to the inverting input of first subtractor 1223, which subtracts the input signal from the stored input signal in first register 1221. The output signal, a, of first subtractor 1223 represents the in-phase amplitude of the IF signal, and the output signal, b, of second subtractor 1224 represents the quadrature amplitude of the of the IF signal. Second-level demodulator 550 has a real value output (for the a value) coupled with the first subtractor 1223 output and an imaginary value output (for the b value) coupled with the second subtractor 1224 output.

However, compared to signals from the other sub-antennas in phased array antenna 510, the in-phase and quadrature signals may be shifted, depending on the sub-antennas' positions in phased array antenna 510 and their orientation towards the transmitter of the received signal. To compensate for the shift, the in-phase and quadrature signals may need to be phase rotated by an angle θ to amplify the desired signal (when accumulating the phase-rotated signals from the multiple instances of second-level demodulator 550) and to reduce undesired signals. (Synchronizer 560 may introduce an additional phase rotation for a final phase correction for subcarriers demodulator 565.)

To rotate a vector a+ib, where $i^2$=−1, with an angle θ, one can multiply the vector with cos θ+i sin θ. The rotated vector is given by Re+i Im:

Re=$a$ cos θ−$b$ sin θ

Im=$a$ sin θ+$b$ cos θ

See, for example, https://en.wikipedia.org/wiki/Rotation matrix.

Associated with the instance of second-level demodulator 550, phase-rotating set 1410 in beamformer 555 includes first rotation angle register 1231, second rotation angle register 1232, and a field that may include four multipliers, a subtractor, and an adder (multiplier-subtractor-adder field 1233). First rotation angle register 1231 is used to store the value c=sin θ, and second rotation angle register 1232 is used to store the value d=cos θ. Multiplier-subtractor-adder field 1233 is coupled with first subtractor 1223, second subtractor 1224, first rotation angle register 1231, and second rotation angle register 1232, and has the values a, b, c, and d, respectively, as its input values. Through cross-multiplication, subtraction, and addition, as drawn, multiplier-subtractor-adder field 1233 calculates the values:

$ad−bc$=Re $ac+bd$=Im which together represent the rotated value of the received signal.

Although the implementation in FIG. 12 samples at 4 times the IF frequency, other implementations may sample at different rates, for example 8 times the IF frequency. Such implementations may decimate the samples to 4 times the IF frequency before entering multiplexer 1220. Alternatively, instead of using a 4-counter and a multiplexer to demodulate the signal, they may use an 8 counter and a multiplier at 8 times the IF frequency to multiply the 8 successive input values in an IF cycle with 4 values of a sine and 4 values of a cosine IF demodulation signal. And although the implementation in FIG. 12 uses 4 registers, other implementations may use fewer or more registers to perform the functionality described above. Implementations may further add circuitry to down-sample the output signals Re and Im, which may be at, for example, the IF frequency.

Figure 13:
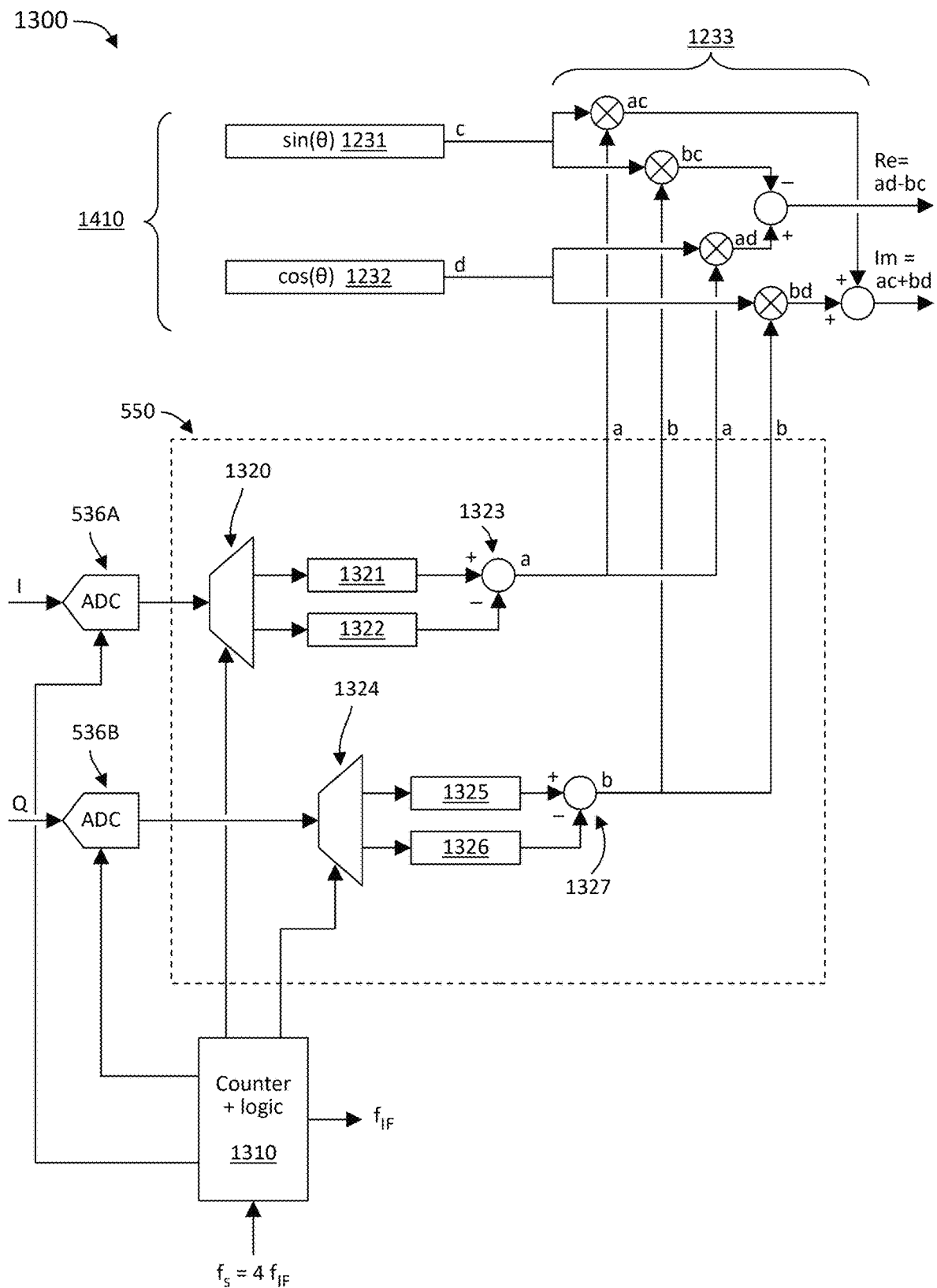
FIG. 13 illustrates an example implementation that combines the ADCs of an instance of the RF frontend in FIG. 7B with an instance of the second-level demodulator and the associated phase-rotating circuitry in the beamformer.

FIG. 13 illustrates an example implementation 1300 that combines ADCs 536A-B of an instance of the RF frontend in FIG. 7B with an instance of second-level demodulator 550 and the associated phase-rotating set 1410 in the beamformer.

In this case, ADCs 536A and B sample the down-converted RF signal at a sample frequency $f_S$ that equals 2 times the intermediate frequency $f_{IF}$ used in the transmitter for second-level modulation, and that is phase-aligned with sine and the cosine waves at $f_{IF}$. Counter logic 1310 generates all clocks and the multiplexer selection signals used in implementation 1300, based on an input clock of, for example, four times $f_{IF}$. First multiplexer 1320 is coupled with the output of ADC 536A and passes its samples alternatingly to first register 1321 and second register 1322. Second multiplexer 1324 is coupled with the output of ADC 536B and passes its samples alternatingly to third register 1325 and fourth register 1326. First subtractor 1323 calculates the difference between the values in first register 1321 and second register 1322, and second subtractor 1327 calculates the difference between the values in third register 1325 and fourth register 1326. These differences, a and b, represent the in-phase and quadrature amplitudes of the IF signal. In this implementation, second-level demodulator 550 has a real value output (for the a value) coupled with] the first subtractor 1323 output and an imaginary value output (for the b value) coupled with the second subtractor 1327 output. In the same way as described with reference to FIG. 12, phase-rotating set 1410 rotates the phase of the demodulated signal with an angle θ in the beam-forming process.

Although the implementation in FIG. 13 samples at 2 times the IF frequency, other implementations may sample at different rates, for example 4 or 8 times the IF frequency. Such implementations may down-sample to 2 times the IF frequency before entering multiplexer 1320 or second multiplexer 1324. Alternatively, instead of using a 4-counter and multiplexers to demodulate the signal, they may use an 8 counter and multipliers at 4 times the IF frequency to multiply the 8 successive input values in an IF cycle with 4 values of a sine and 4 values of a cosine IF demodulation signal. And although the implementation in FIG. 13 uses 6 registers, other implementations may use fewer or more registers to perform the functionality described above. Implementations may further add circuitry to down-sample the output signals Re and Im, which may be at, for example, the IF frequency.

Figure 14:
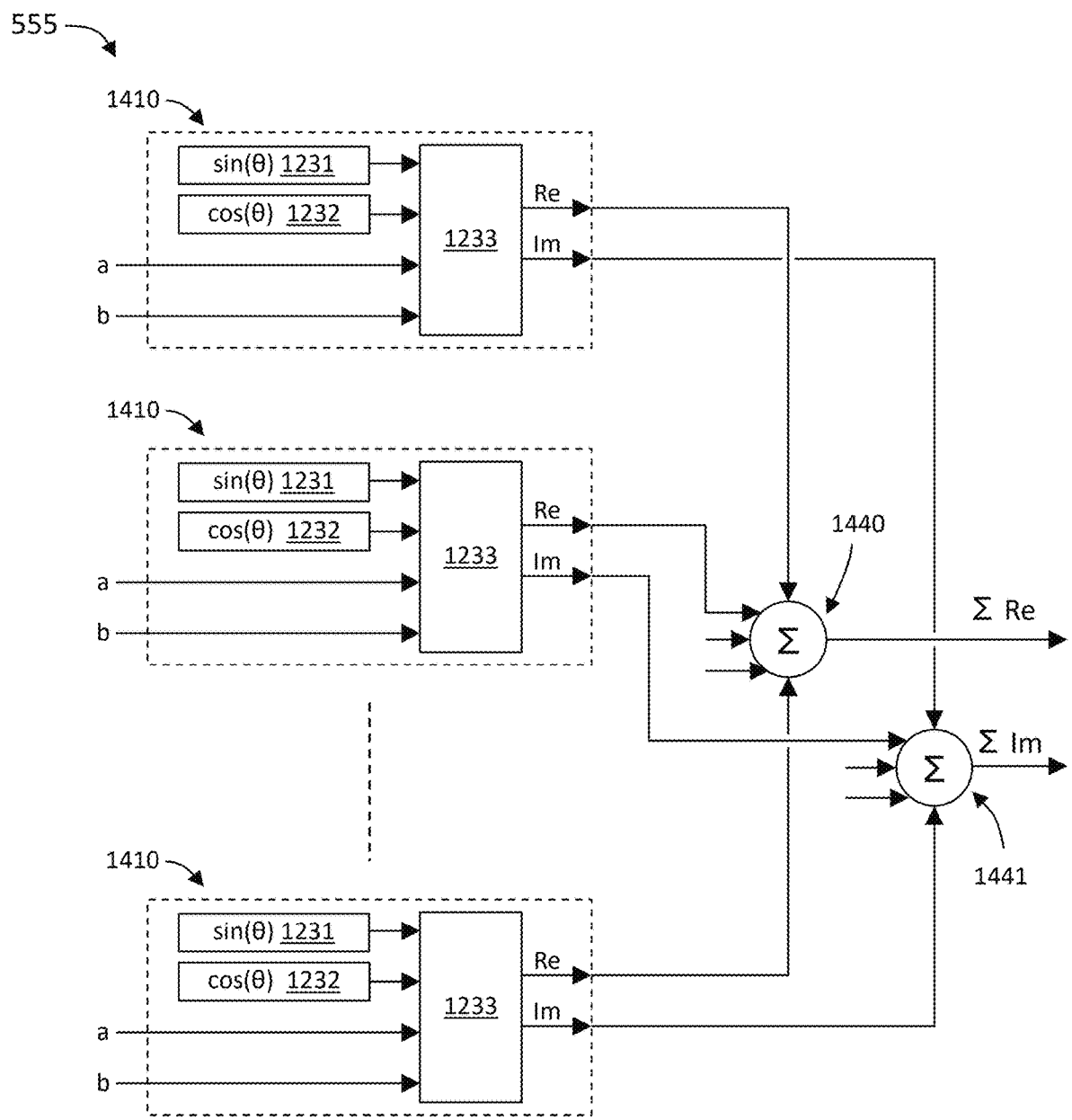
FIG. 14 illustrates an overview of the beamformer, with multiple instances of a phase-rotating set that include rotation angle registers and multiplier-subtractor-adder fields.

FIG. 14 illustrates an overview of beamformer 555, with multiple instances of phase-rotating set 1410 that include first rotation angle register 1231, second rotation angle register 1232, and multiplier-subtractor-adder field 1233. The multiplier-subtractor-adder field 1233 is configured to multiply a complex value received from second-level demodulator 550 with a complex value stored in first rotation angle register 1231 and second rotation angle register 1232 to obtain a phase-shifted complex value, including a real value (Re) and an imaginary value (Im). Each phase-rotating set 1410 is associated with a sub-antenna, an RF frontend 530, and a second-level demodulator 550. An adder 1440 accumulates the Re signals from the individual phase-rotating sets 1410 to provide a Σ Re signal and an adder 1441 accumulates the Im signals from the individual phase-rotating sets 1410 to provide a Σ Im signal. Beamformer 555 outputs the Σ Re signal and the Σ Im signal for synchronizer 560, which based on feedback from equalizer 570 corrects their final phase for the baseband input signals BB Re and BB Im for subcarriers demodulator 565.

Figure 15:
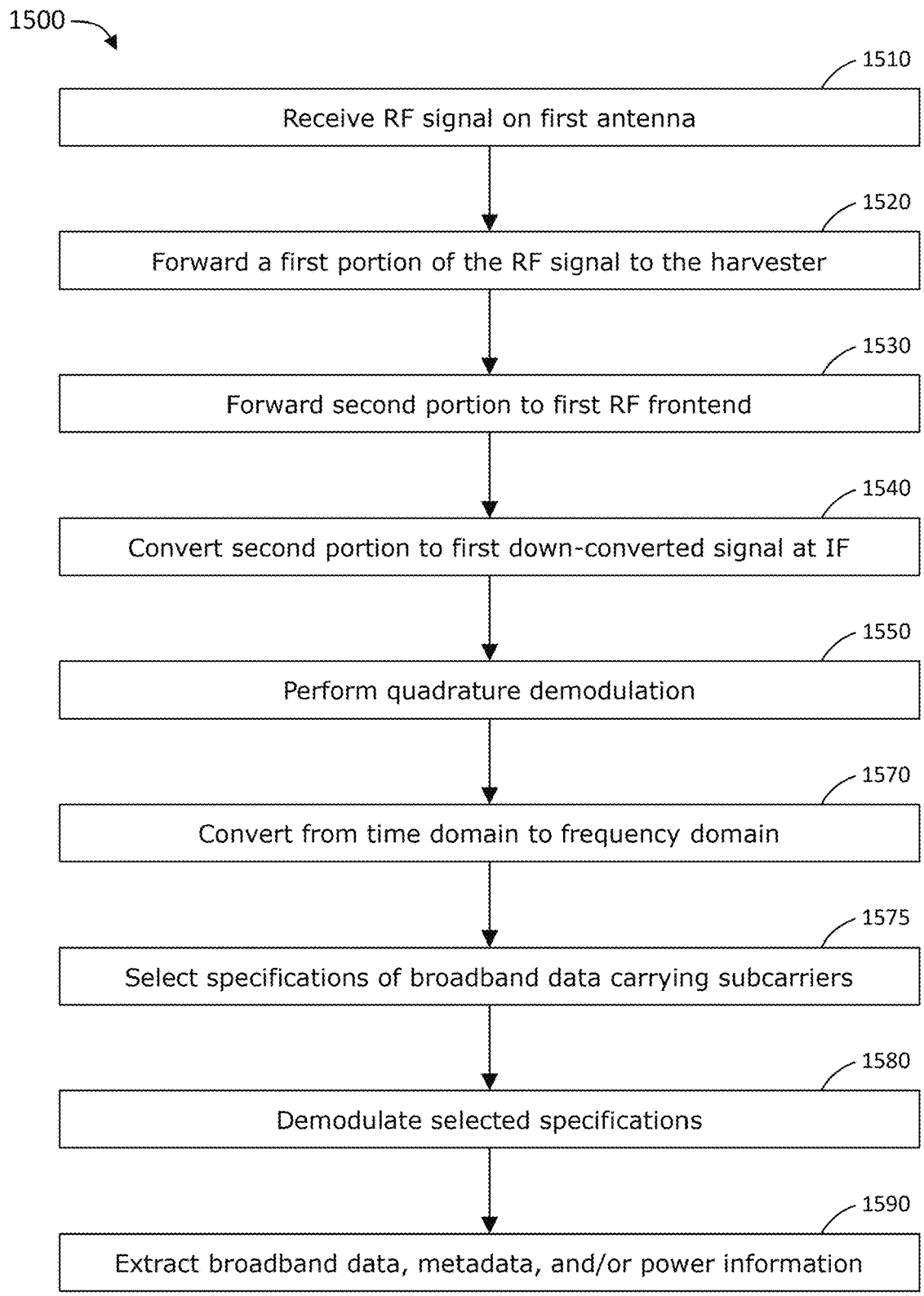
FIG. 15 illustrates an example method of receiving wireless power and broadband data from a transmitter.

FIG. 15 illustrates an example method 1500 of receiving wireless power and broadband data from a transmitter. Method 1500 may include the following actions:

1510—Receiving an RF signal on a first antenna.

1520—Forwarding a first portion of the RF signal to a harvester to harvest the wireless power from power-carrying subcarriers included in the RF signal.

1530—Forwarding a second portion of the RF signal, associated with the first antenna, to a first RF frontend.

1540—In the first RF frontend, converting the second portion of the RF signal to an intermediate frequency (IF) that is aligned in frequency and phase with a transmitter IF to obtain a first down-converted signal.

1550—In a first second-level demodulator, performing a quadrature demodulation on the first down-converted signal to obtain a first complex baseband signal.

1570—In a subcarriers demodulator, converting a frame including the first complex baseband signal from a time domain to a frequency domain to obtain subcarriers specifications.

1575—From the subcarriers specifications, selecting specifications of broadband data carrying subcarriers while skipping specifications of power-carrying subcarriers.

1580—In a first-level demodulator, demodulating selected specifications of broadband data carrying subcarriers to obtain data bits.

1590—In a demapper, extracting at least one of broadband data, metadata, or power information from the data bits.

Figure 16:
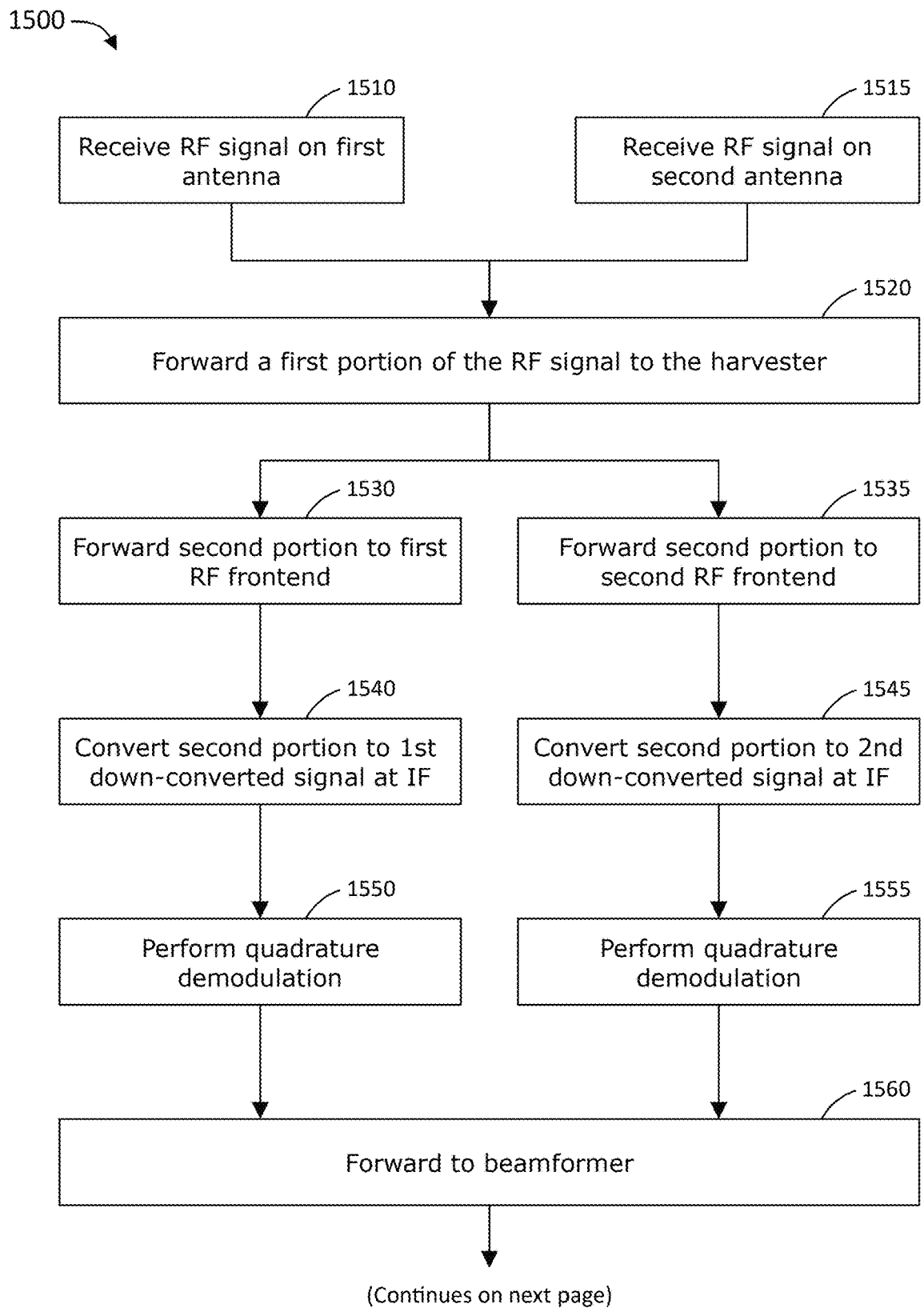
FIG. 16 illustrates how the method of FIG. 15 can be expanded to receive the broadband data and/or wireless power from a specific direction.
Figure 16:
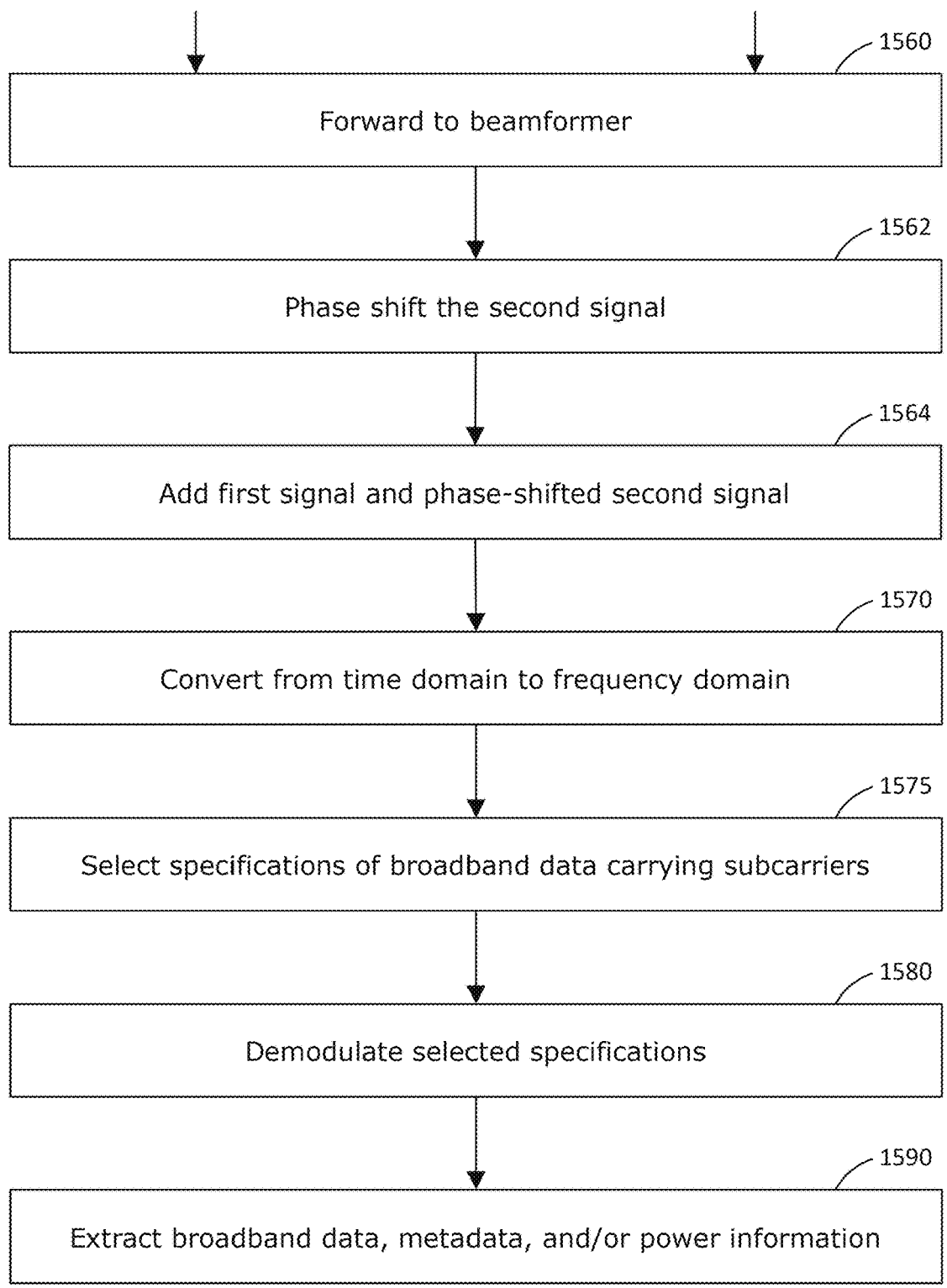

FIG. 16 illustrates how method 1500 of FIG. 15 can be expanded to receive the broadband data and/or wireless power from a specific direction. The method now includes the following steps:

1510—Receiving an RF signal on a first antenna.

1515—Receiving (a phase-shifted version of) the RF signal on a second antenna.

1520—Forwarding a first portion of the RF signal to a harvester to harvest the wireless power from power-carrying subcarriers included in the RF signal.

1530—Forwarding a second portion of the RF signal, associated with the first antenna, to a first RF frontend.

1535—Forwarding the second portion of the RF signal, associated with the second antenna, to a second RF frontend.

1540—In the first RF frontend, converting the second portion of the RF signal to an intermediate frequency (IF) that is aligned in frequency and phase with a transmitter IF to obtain a first down-converted signal.

1545—In the second RF frontend, converting the second portion of the RF signal to the IF to obtain a second down-converted signal.

1550—In a first second-level demodulator, performing a quadrature demodulation on the first down-converted signal to obtain a first complex baseband signal.

1555—In a second second-level demodulator, performing the quadrature demodulation on the second down-converted signal to obtain a second complex baseband signal.

1560—Forwarding the first complex baseband signal and the second complex baseband signal to a beamformer.

1562—In the beamformer, phase-shifting the second complex baseband signal to obtain a second phase-rotated complex baseband signal. Phase-shifting the second complex baseband signal may include multiplying the second complex baseband signal with a complex number including directional information.

1564—In the beamformer, adding the second phase-rotated complex baseband signal to the first complex baseband signal.

1570—In a subcarriers demodulator, converting the frame including the first complex baseband signal from a time domain to a frequency domain to obtain subcarriers specifications.

1575—From the subcarriers specifications, selecting specifications of broadband data carrying subcarriers while skipping specifications of power-carrying subcarriers.

1580—In a first-level demodulator, demodulating selected specifications of broadband data carrying subcarriers to obtain data bits.

1590—In a demapper, extracting at least one of broadband data, metadata, or power information from the data bits.

Implementations may determine the direction from which to receive in various ways. These include scanning the direction for maximum (and/or minimum) signal reception; scanning the direction for the lowest bit error rate (BER); analyzing a received signal; retrieving the preferred or initial direction from a memory; analyzing transmitter coordinates (such as global positioning system (GPS) coordinates) embedded in a transmission; retrieving a transmitter identification (ID) and looking up the direction in a table; determining phase angles between signals received in pairs of sub-antennas; user inputs; and any other methods.

Figure 17:
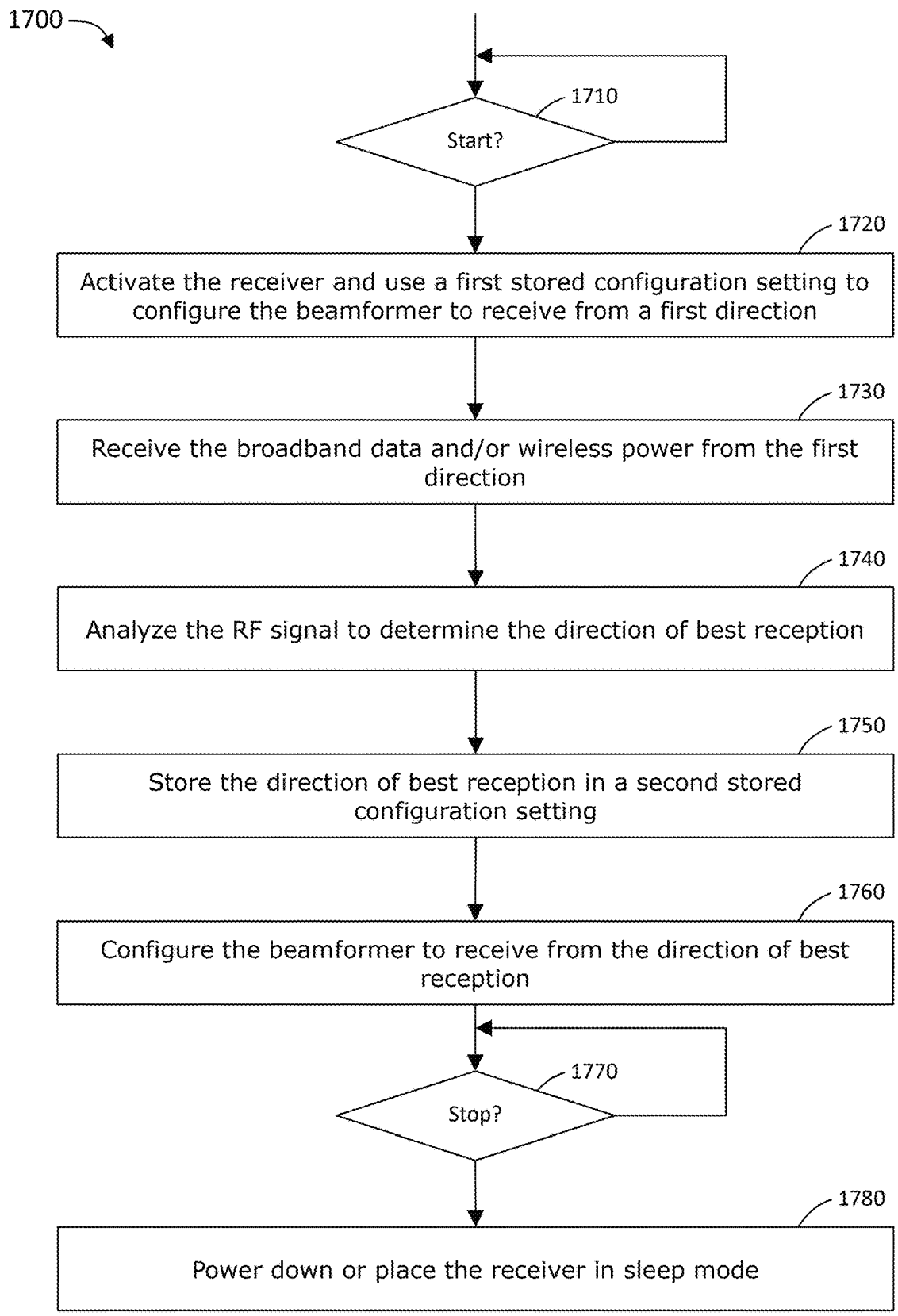
FIG. 17 illustrates an example method of directing an angle of reception in a receiver that can simultaneously receive broadband data and wireless power.

An example method 1700 of directing an angle of reception in a receiver that can simultaneously receive broadband data and wireless power includes (FIG. 17):

1710—In a power management circuit, determining if the receiver should start demodulating broadband data and/or harvesting wireless power. The power management circuit may control sleep modes and/or it may include a power-on reset (POR) circuit. Demodulation and/or harvesting may need to start when a supply voltage exceeds a first limit, when the received signal strength reaches a first signal strength limit, or when the implementation expects a transmission of interest.

1720—In response to determining that the receiver should start demodulating data and/or harvesting wireless power, activating at least a part of the receiver and using a first stored configuration setting to configure a beamforming circuit to receive at least one of broadband data or wireless power from a first direction. Activating at least a part of the receiver may include providing or increasing the supply voltage to the part of the receiver, and/or changing it from a sleep mode to an active mode, and/or providing clock pulses to the part of the receiver.

1730—Receiving the at least one of broadband data or wireless power from the first direction.

1740—Analyzing a received radio frequency (RF) signal including the at least one of broadband data or wireless power to determine a direction of a best reception. The direction of best reception is the direction that has the maximum signal strength or the direction that has the lowest bit error rate (BER).

1750—Storing information including the direction of best reception in a second stored configuration setting. The implementation may store the second stored configuration setting in the same memory as or in a different memory than the first stored configuration setting.

1760—Configuring the beamforming circuit to receive from the direction of best reception.

1770—In the power management circuit, detecting if the receiver should stop demodulating the broadband data and/or the harvesting wireless power. For example, the power management circuit may detect that the supply voltage drops below a second limit, or that the received signal strength drops below a second signal strength limit, or that there is no longer a transmission of interest.

1780—If the receiver should stop demodulating the broadband data and/or harvesting the wireless power, the implementation powers down the receiver or places it in a sleep mode.

PARTICULAR IMPLEMENTATIONS

Described implementations of the subject matter can include one or more features, alone or in combination, as described in the following first set of clauses.

Clause 1. A receiver for wireless power and broadband data, comprising:
an energy harvester 528 to harvest the wireless power;
one or more radio-frequency frontends (one or more RF frontends 530) configured to down-convert a frequency band received from a transmitter to a receiver intermediate frequency (receiver IF) that is frequency and phase aligned with a transmitter IF, wherein the frequency band includes the broadband data and the wireless power modulated on multiple subcarriers, the multiple subcarriers being orthogonal to each other;
one or more second-level demodulator(s) 550, coupled with the one or more RF frontends 530, wherein a second-level demodulator 550 is configured to demodulate a stream of complex values from the down-converted frequency band, the complex values including real values and imaginary values;
a subcarriers demodulator 565 coupled with the one or more second-level demodulator(s) 550 and configured to convert the complex values from a time domain to a frequency domain and to output a series of subcarrier specifications; and
a first-level demodulator 580 to convert the series of subcarrier specifications to data bits that include the broadband data.

Clause 2. The receiver of clause 1, further comprising:
a switch/splitter 522 configured to be coupled with a phased array antenna 510 and configured to couple individual sub-antennas in the phased array antenna 510 with one or more individual RF frontends 530 and/or with individual impedance matching circuits 524; and
beamformer 526 coupled with the individual impedance matching circuits 524 and with the energy harvester 528, wherein delays of beamformer 526 can be individually configured.

Clause 3. The receiver of clause 1 or clause 2, wherein:
the switch/splitter 522 includes a switch configured to couple an individual sub-antenna with either an individual RF frontend 530 or beamformer 526.

Clause 4. The receiver of any of the clauses 1 to 3, wherein:
the switch/splitter 522 includes a splitter configured to couple an individual sub-antenna with both an individual RF frontend 530 and beamformer 526.

Clause 5. The receiver of any of the clauses 1 to 4, wherein:
one of the one or more RF frontends 530 includes an analog-to-digital converter (ADC 536A) configured to sample the down-converted frequency band at a sample rate that is aligned in phase and frequency with four (4) times an intermediate frequency used in the transmitter.

Clause 6. The receiver of any of the clauses 1 to 4, wherein:
one of the one or more RF frontends 530 includes two analog-to-digital converters (ADCs 536A-B) configured to sample the down-converted frequency band at a sample rate that is aligned in phase and frequency with two (2) times an intermediate frequency used in the transmitter, and wherein the phase of the sample rate of one of the ADCs is shifted ninety degrees.

Clause 7. A method of receiving wireless power and broadband data from a transmitter, the method comprising:
(1510) receiving a radio-frequency signal (an RF signal) on a first antenna;
(1520) forwarding a first portion of the RF signal to a harvester to harvest the wireless power from power-carrying subcarriers included in the RF signal;
(1530) forwarding a second portion of the RF signal, associated with the first antenna, to a first RF frontend;
(1540) in the first RF frontend, converting the second portion of the RF signal to an intermediate frequency (IF) that is aligned in frequency and phase with a transmitter IF to obtain a first down-converted signal;
(1550) in a first second-level demodulator, performing a quadrature demodulation on the first down-converted signal to obtain a first complex baseband signal;
(1570) in a subcarriers demodulator, converting a frame including the first complex baseband signal from a time domain to a frequency domain to obtain subcarriers specifications;
(1575) from the subcarriers specifications, selecting specifications of broadband data carrying subcarriers;
(1580) in a first-level demodulator, demodulating selected specifications of broadband data carrying subcarriers to obtain data bits; and
(1590) in a demapper, extracting at least one of broadband data, metadata, or power information from the data bits.

Clause 8. The method of clause 7, further comprising:
(1515) receiving the RF signal on a second antenna;
(1535) forwarding the second portion of the RF signal, associated with the second antenna, to a second RF frontend;
(1545) in the second RF frontend, converting the second portion of the RF signal to the IF to obtain a second down-converted signal;
(1555) in a second second-level demodulator, performing the quadrature demodulation on the second down-converted signal to obtain a second complex baseband signal;
(1560) forwarding the first complex baseband signal and the second complex baseband signal to a beamformer;
(1562) in the beamformer, phase-shifting the second complex baseband signal to obtain a second phase-rotated complex baseband signal; and
(1564) in the beamformer, adding the second phase-rotated complex baseband signal to the first complex baseband signal.

Clause 9. A method 1700 of directing an angle of reception in a receiver that can simultaneously receive broadband data and wireless power, the method comprising:
(1710) in a power management circuit, determining if the receiver should start demodulating broadband data and/or harvesting wireless power;
(1720) in response to determining that the receiver should start demodulating data and/or harvesting wireless power, activating at least a part of the receiver and using a first stored configuration setting to configure a beamforming circuit to receive at least one of broadband data or wireless power from a first direction;
(1730) receiving the at least one of broadband data or wireless power from the first direction;
(1740) analyzing a received radio frequency (RF) signal including the at least one of broadband data or wireless power to determine a direction of a best reception, wherein the direction of best reception is one of a direction that has a maximum signal strength and a direction that has a lowest bit error rate (BER);
(1750) storing information including the direction of best reception in a second stored configuration setting;
(1760) configuring the beamforming circuit to receive from the direction of best reception;
(1770) in the power management circuit, detecting if the receiver should stop demodulating the broadband data and/or the harvesting wireless power; and
(1780) in response to detecting that the receiver should stop demodulating the broadband data and/or harvesting the wireless power, performing one of powering down the receiver and placing the receiver in a sleep mode.

Described implementations of the subject matter can include one or more features, alone or in combination, as described in the following second set of clauses.

Clause 1. A receiver for wireless power and broadband data, comprising:
an energy harvester 528 to harvest the wireless power;
one or more radio-frequency frontends (one or more RF frontends 530) configured to down-convert a frequency band received from a transmitter to a receiver intermediate frequency (receiver IF) that is frequency and phase aligned with a transmitter IF, wherein the frequency band includes the broadband data and the wireless power modulated on multiple subcarriers, the multiple subcarriers being orthogonal to each other;
one or more second-level demodulator(s) 550, coupled with the one or more RF frontends 530, wherein a second-level demodulator 550 is configured to demodulate a stream of complex values from the down-converted frequency band, the complex values including real values and imaginary values;

a subcarriers demodulator 565 coupled with the one or more second-level demodulator(s) 550 and configured to convert the complex values from a time domain to a frequency domain and to output a series of subcarrier specifications; and a first-level demodulator 580 to convert the series of subcarrier specifications to data bits that include the broadband data.

Clause 2. The receiver of clause 1, wherein a second-level demodulator 550 includes:

a multiplexer 1220 with an input coupled with one of the one or more RF frontends 530, a first mux output, a second mux output, a third mux output, and a fourth mux output;

a second register 1222 with an input coupled with the first mux output;

a first register 1221 with an input coupled with the second mux output;

a second subtractor 1224 with a positive input coupled with an output of the second register 1222 and a negative input coupled with the third mux output;

a first subtractor 1223 with a positive input coupled with an output of the first register 1221 and a negative output coupled with the fourth mux output;

a real value output coupled with an output of the first subtractor 1223; and an imaginary value output coupled with an output the second subtractor 1224.

Clause 3. The receiver of clause 1, wherein a second-level demodulator 550 includes:

a first multiplexer 1320 with an input coupled with a first ADC in one of the one or more RF frontends 530, a first mux1 output, and a second mux1 output;

a second multiplexer 1324 with an input coupled with a second ADC in the one of the one or more RF frontends 530, a first mux2 output, and a second mux2 output;

a first register 1321 with an input coupled with the first mux1 output;

a second register 1322 with an input coupled with the second mux1 output;

a third register 1325 with an input coupled with the first mux2 output;

a fourth register 1326 with an input coupled with the second mux2 output;

a first subtractor 1323 with a positive input coupled with an output of the first register 1321 and a negative input coupled with an output of the second register 1322;

a second subtractor 1327 with a positive input coupled with an output of third register 1325 and a negative input coupled with an output of the fourth register 1326;

a real value output coupled with an output of the first subtractor 1323; and an imaginary value output coupled with an output the second subtractor 1327.

Clause 4. The receiver of clause 1, further comprising a beamformer 555 including multiple phase-rotating sets 1410, each coupled with a real value output and an imaginary value output of a second-level demodulator 550 and all coupled with a first adder 1440 and a second adder 1440;

wherein:

a phase-rotating set 1410 includes a multiplier-subtractor-adder field 1233 coupled with a first rotation angle register 1231 and a second rotation angle register 1232, wherein the multiplier-subtractor-adder field 1233 is configured to multiply a complex value received from the second-level demodulator 550 with a complex value stored in the first rotation angle register 1231 and the second rotation angle register 1232 to obtain a phase-shifted complex value; and the first adder 1440 and the second adder 1440 accumulate phase-shifted complex values received from the multiple phase-rotating sets 1410.

CONSIDERATIONS

We describe various implementations of a digital receiver for broadband data and power. Implementations that use a phased array antenna (or multiple antennas) and beamformer are capable of receiving data and power from specific directions to maximize reception sensitivity and power efficiency.

The technology disclosed can be practiced as an apparatus or a method. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to specific implementations thereof, these specific implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above. For example, figures and descriptions may refer to OFDM, but implementations may use other orthogonal modulation systems instead of OFDM. Figures and descriptions may focus on using IFFT and FFT, but implementations may use other transforms between frequency and time domains or similar domains. Examples may show DSB systems, but implementations may be built for or be suited for SSB (de) modulation. Examples may show upper sideband implementations, but implementations may be built around lower sideband signals. Although examples show that the second-level demodulator retrieves the baseband real signal by multiplying with a sine component and the baseband imaginary signal by multiplying with a cosine component, implementations may retrieve the baseband real signal by multiplying with a cosine component and the baseband imaginary signal by multiplying with a sine component.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to specific implementations thereof, these specific implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, a coarse-grained reconfigurable architecture (CGRA), or in a programmable logic device such as a field-programmable gate array (FPGA), obviating the need for at least part of any dedicated hardware. Implementations may be as a single chip, or as a multi-chip module (MCM) packaging multiple semiconductor dies in a single package. All such variations and modifications are to be considered within the ambit of the disclosed technology the nature of which is to be determined from the foregoing description.

Any suitable technology for manufacturing electronic devices can be used to implement the circuits of specific implementations, including CMOS, FinFET, GAAFET, BICMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different specific implementations. In some specific implementations, multiple elements, devices, or circuits shown as sequential in this specification can be operating in parallel.

It will also be appreciated that one or more of the elements depicted in the drawings/figures can also be implemented in a more separated or integrated manner, or even removed or rendered as inoperable in certain cases, as is useful in accordance with a particular application.

Thus, while specific implementations have been described herein, latitudes of modification, various changes, and substitutions are intended in the foregoing disclosures, and it will be appreciated that in some instances some features of specific implementations will be employed without a corresponding use of other features without departing from the scope and spirit as set forth. Therefore, many modifications may be made to adapt a particular situation or material to the essential scope and spirit.

The invention claimed is:

1. A receiver for wireless power and broadband data, comprising:
an energy harvester to harvest the wireless power;
one or more radio-frequency frontends (one or more RF frontends) configured to down-convert a frequency band received from a transmitter to a receiver intermediate frequency (a receiver IF) that is frequency and phase aligned with a transmitter IF, wherein the frequency band includes the broadband data and the wireless power modulated on multiple subcarriers, the multiple subcarriers being orthogonal to each other;
one or more second-level demodulator(s), coupled with the one or more RF frontends, wherein a second-level demodulator is configured to demodulate a stream of complex values from the down-converted frequency band, the complex values including real values and imaginary values;
a subcarriers demodulator coupled with the one or more second-level demodulator(s) and configured to convert the complex values from a time domain to a frequency domain and to output a series of subcarrier specifications; and
a first-level demodulator to convert the series of subcarrier specifications to data bits that include the broadband data.

2. The receiver of claim 1, further comprising:
a switch/splitter configured to be coupled with a phased array antenna and configured to couple individual sub-antennas in the phased array antenna with one or more individual RF frontends and/or with individual impedance matching circuits; and
a beamformer coupled with the individual impedance matching circuits and with the energy harvester, wherein delays of beamformer can be individually configured.

3. The receiver of claim 2, wherein:
the switch/splitter includes a switch configured to couple an individual sub-antenna with at least one of an individual RF frontend or the beamformer.

4. The receiver of claim 2, wherein:
the switch/splitter includes a splitter configured to couple an individual sub-antenna with both an individual RF frontend and the beamformer.

5. The receiver of claim 1, wherein:
one of the one or more RF frontends includes an analog-to-digital converter (ADC) configured to sample the down-converted frequency band at a sample rate that is aligned in phase and frequency with at least four (4) times an intermediate frequency used in the transmitter.

6. The receiver of claim 1, wherein:
one of the one or more RF frontends includes two analog-to-digital converters (ADCs) configured to sample the down-converted frequency band at a sample rate that is aligned in phase and frequency with at least two (2) times an intermediate frequency used in the transmitter, and wherein the phase of the sample rate of one of the ADCs is shifted ninety degrees.

7. A method of receiving wireless power and broadband data from a transmitter, the method comprising:
receiving a radio-frequency signal (an RF signal) on a first antenna;
forwarding a first portion of the RF signal to a harvester to harvest the wireless power from power-carrying subcarriers included in the RF signal;
forwarding a second portion of the RF signal, associated with the first antenna, to a first RF frontend;
in the first RF frontend, converting the second portion of the RF signal to an intermediate frequency (IF) that is aligned in frequency and phase with a transmitter IF to obtain a first down-converted signal;
in a first second-level demodulator, performing a quadrature demodulation on the first down-converted signal to obtain a first complex baseband signal;
in a subcarriers demodulator, converting a frame including the first complex baseband signal from a time domain to a frequency domain to obtain subcarriers specifications;
from the subcarriers specifications, selecting specifications of broadband data carrying subcarriers;

in a first-level demodulator, demodulating selected specifications of broadband data carrying subcarriers to obtain data bits; and in a demapper, extracting at least one of broadband data, metadata, or power information from the data bits.

8. The method of claim 7, further comprising:

receiving the RF signal on a second antenna;

forwarding the second portion of the RF signal, associated with the second antenna, to a second RF frontend;

in the second RF frontend, converting the second portion of the RF signal to the IF to obtain a second down-converted signal;

in a second second-level demodulator, performing the quadrature demodulation on the second down-converted signal to obtain a second complex baseband signal;

forwarding the first complex baseband signal and the second complex baseband signal to a beamformer;

in the beamformer, phase-shifting the second complex baseband signal to obtain a second phase-rotated complex baseband signal; and in the beamformer, adding the second phase-rotated complex baseband signal to the first complex baseband signal.

9. A method of directing an angle of reception in a receiver that can simultaneously receive broadband data and wireless power, the method comprising:

in a power management circuit, determining if the receiver should start demodulating broadband data and/or harvesting wireless power;

in response to determining that the receiver should start demodulating data and/or harvesting wireless power, activating at least a part of the receiver and using a first stored configuration setting to configure a beamforming circuit to receive at least one of broadband data or wireless power from a first direction;

receiving the at least one of broadband data or wireless power from the first direction;

analyzing a received radio frequency (RF) signal including the at least one of broadband data or wireless power to determine a direction of a best reception, wherein the direction of best reception is one of a direction that has a maximum signal strength and a direction that has a lowest bit error rate (BER);

storing information including the direction of best reception in a second stored configuration setting;

configuring the beamforming circuit to receive from the direction of best reception;

in the power management circuit, detecting if the receiver should stop demodulating the broadband data and/or the harvesting wireless power; and in response to detecting that the receiver should stop demodulating the broadband data and/or harvesting the wireless power, performing one of powering down the receiver and placing the receiver in a sleep mode.

* * * * *